United States Patent
Smith

(10) Patent No.: US 7,773,291 B2
(45) Date of Patent: Aug. 10, 2010

(54) LIGHT FILTER/MODULATOR AND ARRAY OF FILTERS/MODULATORS

(75) Inventor: Timothy Smith, Hudson, OH (US)

(73) Assignee: Light Resonance Technologies, LLC., Akron, OH (US)

( * ) Notice: Subject to any disclaimer, the term of this patent is extended or adjusted under 35 U.S.C. 154(b) by 63 days.

(21) Appl. No.: 12/300,817

(22) PCT Filed: May 30, 2007

(86) PCT No.: PCT/US2007/012757

§ 371 (c)(1),
(2), (4) Date: Nov. 14, 2008

(87) PCT Pub. No.: WO2007/142978

PCT Pub. Date: Dec. 13, 2007

(65) Prior Publication Data

US 2009/0257113 A1    Oct. 15, 2009

Related U.S. Application Data

(60) Provisional application No. 60/809,873, filed on Jun. 1, 2006.

(51) Int. Cl.
G02F 1/00 (2006.01)
G02F 1/03 (2006.01)
G02B 26/00 (2006.01)

(52) U.S. Cl. .................. 359/321; 359/252; 359/291

(58) Field of Classification Search .......... 359/245, 359/247, 252, 254, 290, 291, 302, 321, 322
See application file for complete search history.

(56) References Cited

U.S. PATENT DOCUMENTS

| 4,030,813 A | 6/1977 | Kohashi et al. ......... 350/161 S |
| 4,106,848 A | 8/1978 | Conwell et al. ......... 350/96.14 |
| 4,807,968 A | 2/1989 | Leslie ................ 350/311 |
| 4,887,889 A | 12/1989 | Leslie ................ 350/311 |
| 4,900,136 A | 2/1990 | Goldburt et al. .......... 350/360 |
| 5,428,711 A | 6/1995 | Akiyama et al. .......... 395/25 |
| 5,532,851 A | 7/1996 | Usami ................. 359/73 |

(Continued)

FOREIGN PATENT DOCUMENTS

GB    620054    3/1949

(Continued)

OTHER PUBLICATIONS

*Electrically actuated elastomers for electro-optical modulators*; Galler et al; Applied Physics B manuscript Aug. 2, 2006.

(Continued)

*Primary Examiner*—William C Choi
(74) *Attorney, Agent, or Firm*—Renner Kenner Greive Bobak Taylor & Weber

(57) ABSTRACT

A light filter or an array of filters can be either one or two dimensional. The filter or filters use multiple beam interference by varying an optical path length between semi-reflective surfaces. The optical path length between the semi-reflective surfaces is varied by changing a thickness of a polymer film in response to an electric field formed between two semi-transparent electrodes. The filter can be configured in either a transmissive or reflective mode.

41 Claims, 12 Drawing Sheets

U.S. PATENT DOCUMENTS

| | | | |
|---|---|---|---|
| 5,652,672 A | 7/1997 | Huignard et al. | 359/292 |
| 5,680,185 A | 10/1997 | Koyayashi et al. | 349/88 |
| 5,710,655 A | 1/1998 | Rumbaugh et al. | 359/249 |
| 5,820,779 A | 10/1998 | Shouji et al. | 252/299.01 |
| 6,004,442 A | 12/1999 | Choulga et al. | 204/416 |
| 6,088,214 A | 7/2000 | Malone et al. | 361/278 |
| 6,195,196 B1 | 2/2001 | Kimura et al. | 359/295 |
| 6,211,993 B1 | 4/2001 | Wang et al. | 359/260 |
| 6,271,899 B1 | 8/2001 | Lewis et al. | 349/86 |
| 6,396,632 B1 | 5/2002 | Liu et al. | 359/579 |
| 6,950,227 B2 | 9/2005 | Schrader | 359/320 |
| 7,034,432 B1 | 4/2006 | Pelrine et al. | 310/309 |
| 7,061,661 B2 | 6/2006 | Kowarz et al. | 359/291 |
| 7,072,093 B2 | 7/2006 | Piehl et al. | 359/290 |
| 7,368,862 B2 | 5/2008 | Pelrine et al. | 310/800 |
| 7,660,025 B2 * | 2/2010 | Kim et al. | 359/291 |
| 2002/0159153 A1 | 10/2002 | Nishimura et al. | 359/578 |
| 2003/0081319 A1 | 5/2003 | Hsu | 359/579 |
| 2004/0022935 A1 | 2/2004 | Ohnishi et al. | 427/100 |
| 2005/0046313 A1 | 3/2005 | Basheer et al. | 310/800 |
| 2005/0046919 A1 | 3/2005 | Taguchi et al. | 359/237 |
| 2006/0001946 A1 | 1/2006 | Osawa | 359/291 |
| 2006/0050358 A1 | 3/2006 | Bigman | 359/265 |
| 2006/0228064 A1 | 10/2006 | Hunt et al. | 385/2 |

FOREIGN PATENT DOCUMENTS

| | | |
|---|---|---|
| JP | 59083102 | 5/1984 |
| JP | 05281479 | 3/1992 |
| JP | 11211999 | 8/1999 |
| WO | WO 01/48531 A2 | 7/2001 |

OTHER PUBLICATIONS

*Giant lateral electrostriction* in ferroelectric liquid-crystalline elastomers; Lehmann et al; Nature/vol. 410/Mar. 22, 2000; pp. 447-450.

*What is a Silane Coupling Agent*; Gelest, Inc.; www.gelest.com.

*MEMS-Based Display Technology Drives next-Generation FPDs for Mobile Applications*; Sampsell, Jeffrey B.; Information Display, Jun. 2006, pp. 24-28.

*Polymeric, electrically tunable diffraction grating based on artificial muscles*; Aschwanden et al; Nanotechnology Group, ETC Zurich, Tannenstrasse 3, Zurich, Switzerland/ Optics Letters/Vo. 31, No. 17/ Sep. 1, 2006; pp. 2610-2612.

*Swiss Invent a Muscular Display*; Jones, Willie D.; IEEE Spectrum;http://staging.spectrum.ieee.org/print/4715;published Nov. 2006.

* cited by examiner

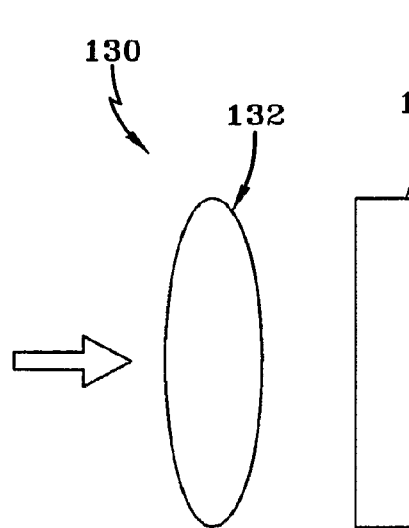
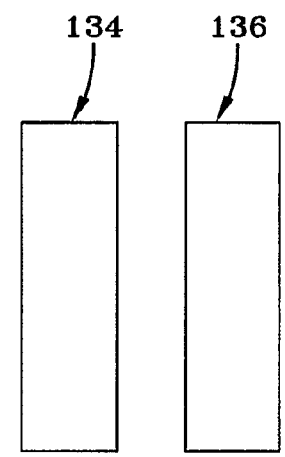
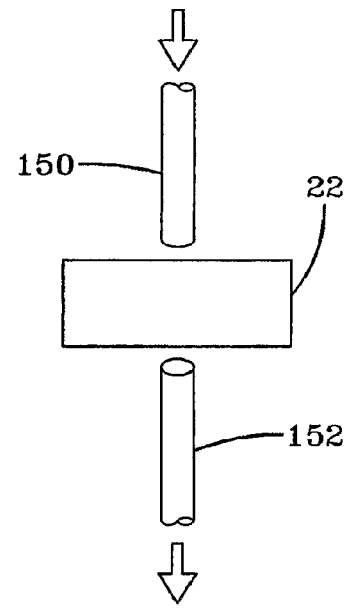
FIG-9
FIG-10
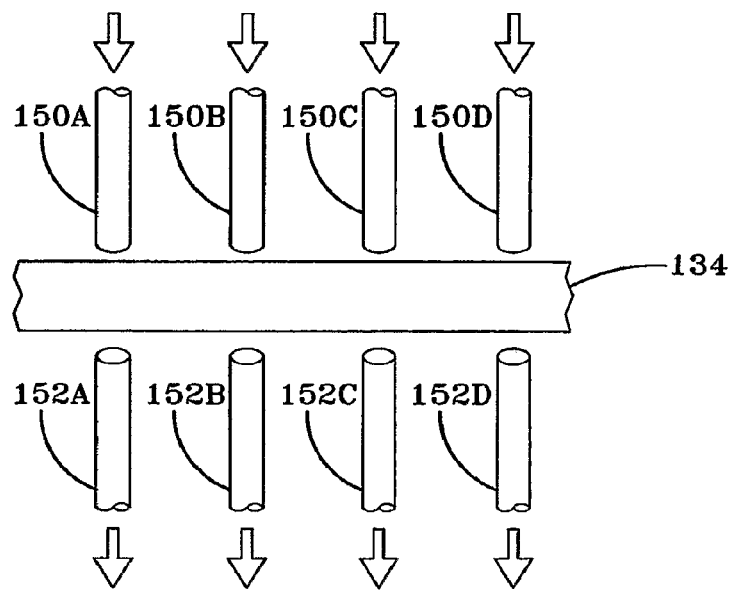
FIG-11

LIGHT FILTER/MODULATOR AND ARRAY OF FILTERS/MODULATORS

CROSS REFERENCE TO RELATED APPLICATION

This application claims priority of U.S. provisional application Ser. No. 60/809,873 filed Jun. 1, 2006, and which is incorporated herein by reference.

TECHNICAL FIELD

The present invention relates to light filters and arrays using the light filters. Specifically, the present invention is directed to light filters that use multiple beam interference by varying a light beam's optical path length between semi-reflective surfaces. In particular, the present invention is directed to a polymer film that changes thickness in response to an electric field, wherein the change in the film's thickness results in a corresponding change in the light beam's optical path length as it passes through the filter.

BACKGROUND ART

Flat panel and projection devices are areas of rapidly growing display technology. Many of these technologies involve the filtering and modulating of light. Better resolution, brighter display, wider color gamut and greater contrast as well as lower production cost and lower energy usage are just a few of the goals of current research and development efforts.

Direct view flat panel displays include computer monitors and televisions as well as portable displays in cell phones, personal data systems, portable games, cameras, global positioning systems and many others. Current technologies such as plasma and liquid crystal displays (LCD) require significant energy to operate and are relatively costly to produce. Plasma is generally limited to displays over forty inches. The large number of thin film transistors (TFTs) that are fabricated in typical LCD's leads to quality control problems, much time spent on product inspection, and high rejection rates.

LCD-based displays require significantly brighter backlights with higher energy usage because of the need for polarization filters and color absorbance filters. Polarization filters absorb 60% of the source light and color filters absorb up to 75% of the source light. Along with the absorbance of other components in an LCD display, typically only about 5% of the source light is transmitted. As such, these devices have poor light and energy efficiency.

The picture quality of LCD displays is not optimal. First, the response time can be considered slow. Second, current LCD technology requires subpixels and provides lower resolution for a given number of electronic components, including thin film transistors and data drivers. Current LCD technology requires polarization and color filters that reduce brightness, provide a small color gamut and limit the number of primary colors that can be used at a time. And finally, LCD technology requires a fairly large number of electronic parts, including TFTs at each subpixel so that there is typically a large amount of black matrix associated with each pixel that does not transmit the source light.

There is a need for a direct view display that provides a high resolution with fewer subpixels per pixel with a concurrent reduction in electronic parts, including TFTs and data drivers. There is also a need for a display where the polarization and color absorbance filters are eliminated to provide greater brightness, a wider color gamut, more pure saturated color, and better contrast ratio. And there is a need for a display that uses light more efficiently, that eliminates polarization filters and color absorbance filters and minimizes dark matrix effects.

Current projection displays, such as digital micromirror devices (DMD), liquid crystal light valves (LCD) and liquid crystal on silicon (LCOS) have many of the same drawbacks as flat panel direct view displays. Current technology requires the use of polarization filters as used in LCD and LCOS. All three technologies can use three separate light valves to display three separate colors leading to increased manufacturing costs. If one light valve is used, then absorbance filter color wheels must be used. DMD requires expensive micromachining. Therefore, there is a need for a technology that offers superior picture quality to LCD, LCOS and DMD without the shortcomings inherent in these devices.

Based on the foregoing, it is clear that there is a need for light filters used in projection displays that can supply high contrast, wide color gamut with fewer than three light valves. There is also a need for technology that eliminates the need for polarization and color absorbance filters, with the resulting brighter display with a wider color gamut. It is also desirable to reduce the number of electronic parts to reduce the "screen door effect," a negative effect seen in some LCD-based projection displays. There is also a need for a technology that provides full color control within one light valve without the use of absorbance color wheels. And there is also a need to provide more saturated colors, thus offering a clearer picture at high intensity with less washout. There is also a need for a projection display with high light efficiency that will transmit most of the source light. Additionally, it is believed that brighter displays may be achieved without the heat buildup that is characteristic of prior art projection display technology.

There is also a need for technology which improves the use of laser and LED arrays used as image formers for toner/fuser printers. For instance, there is a need for technology which allows for improved, multiple resolutions. Current devices use a complicated system of lasers and rotating mirrors and lenses, as is the case with current laser printers. As such, there is a need for a technology which is not limited by the size of the laser dot, as with laser technology, nor is it limited by the size of the LEDs in an LED array. And there is a need for technology which provides a less costly alternative to laser printers by eliminating the need for expensive lasers. Additionally, there is a need for greater speed so that whole lines can be projected across the imaging drum at a single time. There is also a need for finer detail than is available from current technologies because of the variation in light intensity that can be projected on the image drum.

It is also believed that improved light filters and associated arrays can be used in an image former for large format printers including lithography.

And finally, there is a need for a filter technology that is adaptable for use with digital cameras, video cameras, and other image formation devices, such as electronically tunable filters, spatial light modulators, spectroscopy devices, microscopy devices, holographics, data bus and wavelength division multiplexing (WDM) devices and large Fabry Perot interferometers.

There are a number of prior art devices that use various forms of polysiloxane which changes its physical properties upon application of an electric field. For example, a light modulator has been described having two deformable dielectric layers; where at least one dielectric layer is a relief-forming gel, such as a polyorganosiloxane gel, and the other layer is air. Reliefs are generated at the interface between the layers in response to signals applied to electrodes provided on either side of the dielectric layers.

Another prior art optical switching device manipulates an incident light wave passing through the device having an electrically controlled variable thickness plate. The device comprises a first transparent electrode; a second transparent electrode; and a layer of dielectric and transparent viscoelastic material located between the first and second electrodes that deforms in local thickness in response to an electric field. The transparent viscoelastic material includes silicone gel, oil, various polymer materials and other viscous substances that undergo viscous flow when placed in the presence of an electric field and relax towards their original form when the electric field ceases.

Another type of device is a control element that has been described having a liquid layer with electroosmotic movement to attain a geometrically uneven state in response to an electrical signal, having a high sensitivity to an applied voltage. The liquid layer contains at least one silicon compound, preferably a derivative of silane or siloxane including organopolysiloxane.

Still another device is a solid state light modulator that includes a charge storage device including a semiconductor substrate and associated with at least one display electrode; a deformable elastomer layer, a silica containing gel, such as a polydimethyl siloxane (PDMS); and a light reflective metal electrode layer. A potential applied between the display electrodes and the upper electrode causes the gel layer to deform in a rippled pattern.

A transparent film or coating composition blend of polysiloxane and liquid crystalline components has been used as an organic nonlinear optical unit in a light modulator device. The molecular orientation of the polysiloxane molecules can be external field-induced.

Some of the above devices require the polymer material to remain in a fluid or flowable condition. Thus, the completed assembly must be maintained in a flat, horizontal orientation. Even in devices where there is some type of adherence between the polymer material and the substrate, movement of the device may cause sagging of the polymer material, thus the light-altering properties of the polymer material cannot be sufficiently controlled. Some of the above devices require a thickness of more than 10 microns. Although these devices are believed to be effective for their stated purpose, their specific attributes and formulations are not conducive for use in displays. Therefore, there is a need in the art for a polysiloxane configuration which is adapted for use in light filters and light modulators that can be used in display type devices.

SUMMARY OF THE INVENTION

In light of the foregoing, it is a first aspect of the present invention to provide a light filter/modulator and array of filters/modulators.

Another aspect of the present invention is a light modulator comprising a pair of opposed substrates having a gap therebetween, an electrode disposed on each of the substrates, wherein each paring of the electrode and the substrate has associated therewith reflective properties, a polymer film disposed on and chemically bonded to one of the electrodes, wherein application of a voltage across the electrodes causes a corresponding uniform change in a thickness of the polymer film.

Yet another aspect of the present invention is a polysiloxane polymer comprising a reactive group capable of bonding to an electrode surface and one or more polar groups wherein the polymer is responsive to an electric field.

BRIEF DESCRIPTION OF THE DRAWINGS

For a complete understanding of the objects, techniques and structure of the invention, reference should be made to the following detailed description and accompanying drawings wherein:

FIG. 9 is a schematic diagram of a light modulator utilizing two transmissive filters elements as part of an array of a direct view display according to the concepts of the present invention, wherein a fiber optic face plate is utilized according to the concepts of the present invention;

FIG. 10 is a schematic diagram of a camera system utilizing a light modulator with transmissive filters according to the concepts of the present invention;

FIG. 11 is a schematic diagram of a light modulator with a single filter coupled to a single fiber optic input according to the concepts of the present invention;

BEST MODE FOR CARRYING OUT THE INVENTION

Figure 1:
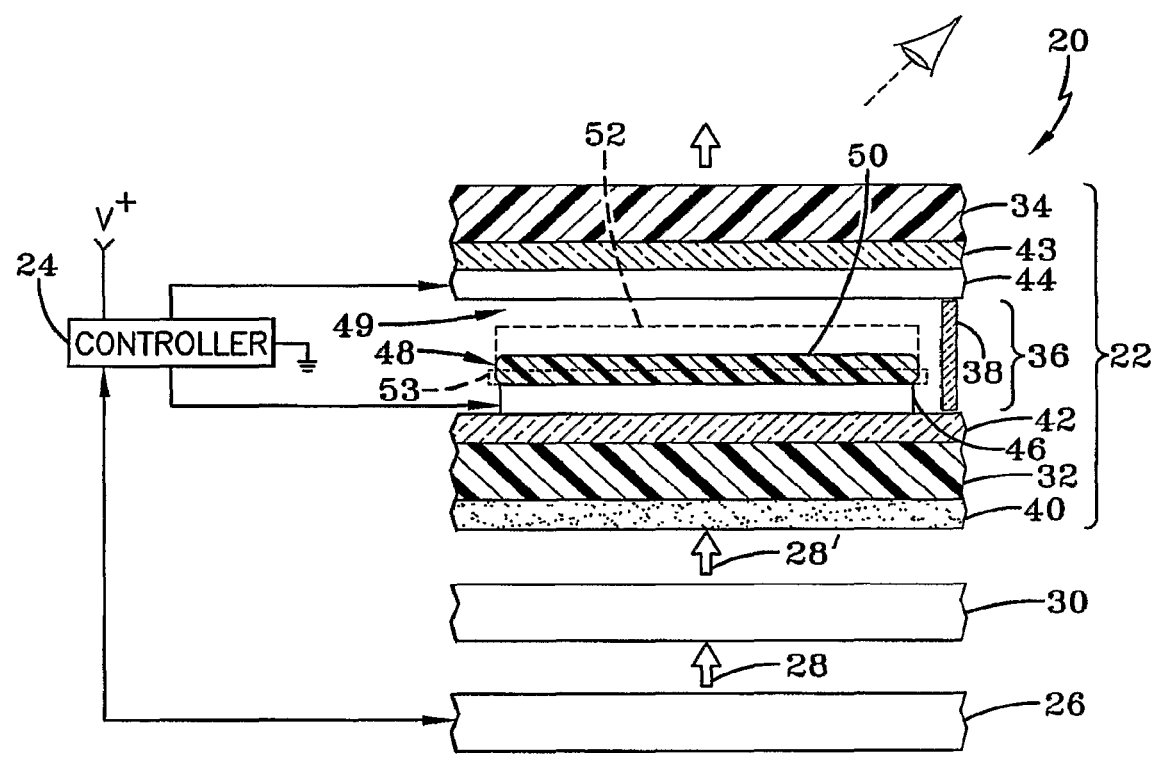
FIG. 1 is a schematic diagram of a light modulator including a single transmissive filter element according to the concepts of the present invention.

Generally, the present invention is directed to a light filter or an array of filters that can be either one or two dimensional. These light filters can be used in a reflectance mode or in a transmissive mode. In other embodiments, the filters can be arranged in a series of transmissive filters, in a series of reflective filters, or in a combination of both reflective and transmissive filters to increase the filtering capabilities.

The device to be described works by filtering and/or modulating light using multiple beam interference which varies the optical path length between semi-reflective surfaces. The optical path length is defined by Σnd, where n is the refractive index of individual layers between the reflective surfaces, and d is the thickness of the individual layers between the reflective surfaces. The optical path length between the semi-reflective surfaces is varied by changing the thickness of a polymer layer in response to an electric field formed between two semi-transparent electrodes that are associated with the semi-reflective surfaces. It should also be appreciated that the components shown in the drawings are not drawn to scale. Moreover, in some instances, the components of the various light modulator embodiments are shown spaced apart from one another. However, the components could be positioned directly adjacent one another if needed. In other words, components of the devices may be in direct contact with one another.

Referring now to the drawings and in particular FIG. 1, it can be seen that a light modulator according to the concepts of the present invention is designated generally by the numeral 20. The modulator 20 shown in FIG. 1 is a basic embodiment for a transmissive type filter that presents the general teachings for the present invention. Skilled artisans will appreciate that the light modulator 20 may be configured in different embodiments, such as reflective, which are presented in later figures. In the present embodiment, the modulator 20 provides a single filter which may be referred to as a picture element or pixel as shown, but could be provided with multiple pixels as will be described. In such cases, where multiple filters are utilized, a modulator may be referred to as a matrix, an array, or array of filters.

The light modulator 20 includes a programmable multiple beam interference light filter designated generally by the numeral 22 which is connected to and controlled by a controller 24. Specifically, the controller 24, which is attached to an electrical power supply, applies power and generates an appropriate control signal for operation of the filter 22 or multiple filters. The controller 24 includes the necessary hardware, software and memory to enable operation of the modulator 20 and, as such, the filter 22. As will become apparent as the description proceeds, variations of the filter 22 embodiments may be provided with alphabetic suffixes.

The light modulator 20 may include a light source 26 which generates broadband, multiple discrete bands, or monochromatic forms of light. The light source 26, which may be connected to the controller 24, or which may be independently controlled, may also generate near-infrared, infrared or ultraviolet (>300 nm) types of light. Depending upon the component structure of the light filter 22, the range of the light source may extend further into the ultraviolet region. The light source may be cold cathode fluorescent, hot cathode fluorescent, electro-luminescent, xenon-based lamps, metal halide, mercury arc, or, in some embodiments, light emitting diodes of three or more colors with fairly narrow bandwidths and others. The aforementioned monochromatic sources may also be light emitting diodes or an appropriate laser source. Broadband sources may include natural or artificial light in camera and imaging applications. A broadband ultraviolet/visible or infrared light source may be used as the light source in spectroscopic applications.

The light source 26 generates an input light 28 which has a wavelength λ such that the optical path length of the filter 22 is an integral multiple of the wavelength at a given time and is passed. Light that is not an integral multiple at a given time is reflected. As will be discussed in further detail, the wavelength λ that is passed is determined by the equation $$\Sigma nd = m\lambda/2 \tag{1}$$

Where n is an integer ≧1. When the optical path length is such that the input light reflected between the reflective surfaces is in phase, constructive interference occurs and the filter transmits the wavelength of light. If this condition does not hold, destructive interference occurs and transmission will be low and the wavelength of light will be reflected. Skilled artisans will appreciate that a change in the optical path length will result in multiple beam interference, which, in turn, results in a corresponding change in the wavelength of light transmitted by the filter or reflected back toward the light source.

The input light 28 generated by the light source 26 may be directed into an optics system designated generally by the numeral 30. Light emanating from the optics system may be referred to as modified input light 28'. In selected embodiments, the optics system 30 may include lenses to collimate the light. The system 30 may also impart a slight angle, <5°, to control the optical path length in the filter 22. In most embodiments, it is believed that an angle closer to 0° is beneficial. In direct view applications, where the light source 26 generates a broad and diffuse light directly behind the filter 22, focus at infinity may not be practical. In this instance, an optical system that guides light 28' into a narrow cone is desired. The optics system 30 may also filter out or block unwanted wavelengths of light. For example, ultraviolet and infrared light may be filtered or blocked from visible light that passes through. The optics system 30 may also filter bandwidths from a broadband light source where dark pixels may be formed. It will also be appreciated that the optics system 30 may be in the form of lenses used by a camera, as will be discussed in other embodiments.

The filter 22, which is proximally positioned near the optics system 30, includes a pair of spaced apart substrates 32 and 34. The substrates 32 and 34 could be in the form of an optically clear glass, or they may comprise silica or any other transparent substrate of sufficient mechanical strength, including flexible transparent polymers such as polyester. The substrates 32 and 34 are spaced apart and provide a gap, designated generally by the numeral 36, therebetween. The gap 36 is maintained by a plurality of spacers 38 which may be in the form of spherical glass beads, glass rods, polymer walls, deposited and etched dielectric, or other such configurations so as to maintain a defined distance between the substrates. The spacers 38 provide a uniform distance between the substrates 32 and 34 which is needed to ensure proper operation of the filter 22.

An anti-reflective coating 40 may be provided on the substrate 32 and positioned in such a manner so as to face the modified input light 28' that is passed through the optics system 30. The anti-reflective coating may be optimized for broadband visible light in such applications as direct view displays, projection and imaging applications. In monochromatic applications, the anti-reflective coating may be optimized for the particular wavelength of the modified input light 28'.

Each substrate 32 and 34 may be provided with a high reflective (HR) dielectric coating. Specifically, the substrate 32 is provided with a high reflective coating 42 and the substrate 34 is provided with a high reflective coating 43. The coatings 42 and 43 are positioned on their respective substrates so as to face one another. Each coating 42 and 43 may comprise an alternating stack of high refractive index and low refractive index films. For broad light sources, the HR coatings may be optimized across the spectrum of the source, such as for example, the visible light spectrum. In displays with RGB light emitting diodes, the HR coatings may be optimized for the specific wavelengths generated by the light emitting diodes. If a light source such as cold cathode fluorescent is used, where phosphors are excited, the HR coatings may be optimized for the narrow primary bands of the phosphors. The HR coatings may be continuously coated on the substrates 32 and 34, or pattern coated as needed. Reflective metal coatings such as silver, platinum, gold or aluminum may be used. Indeed, combinations of metallic and dielectric coatings may be used. It will further be appreciated that HR coating 43 may be made slightly less reflective than HR coating 42 to allow easier passage of light out of the front of the filter. In the alternative, as will be discussed in other embodiments, the HR coatings 42 and 43 may be coated on other components within the filter 22.

For display applications, the reflectance R (where $R=r^2$, where r is the reflectivity of coatings 42, 43) of the coatings should be greater than 75% and, more desirably, greater than 95%. As such, in display applications, the reflectance should be large enough to create fairly narrow, but not too narrow, bandwidths of transmitted color. If an LED array of RGB light is used as the light source 26, the reflectance should be controlled to make the passed bandwidths match the bandwidths of the LEDs. If cold cathode fluorescent or other light source with excited phosphors is used, then the reflectance should be controlled to match the bandwidths of the primary emission bands of the phosphors. Higher reflectance provides narrow bandwidths that make more pure spectral colors and thus, a wider color gamut for display applications, as well as yields darker dark pixels. Narrow bandwidths also provide for darker dark pixels in display applications. Where laser light is used as the light source 26, the reflectance of coatings 42 and 43 can be matched to specific wavelengths of the source to give reflectances greater than 99% so as to pass bandwidths comparable to the laser source, as well as provide filtering of the laser light. In spectroscopic applications, it is believed that embodiments can be provided where the reflectance can be made greater than 99% to provide narrow spectroscopic bandwidths for good resolution.

Disposed on each of the coatings 42 and 43, if provided, or on the substrates 32 and 34 if the coatings are not provided, is a corresponding electrode. Each electrode, which may be selectively patterned, is connected to the controller 24. It will further be appreciated that the electrodes are associated with electronic components to provide for specific applications of voltage. In particular, a common electrode 44 of an active matrix is associated with the substrate 34 and an active electrode 46 of an active matrix is associated with the substrate 32, wherein the coatings are disposed between the electrodes and the substrates. However, it will be appreciated that the electrodes 44 and 46 could be positionally switched on the substrates as needed by a particular application. Moreover, it will be appreciated that each electrode 44 and 46 may be further covered with an insulating layer if required such as $Al_2O_3$ or $SiO_2$ to prevent electrical shorting between the substrates and to provide reactive sites for the chemical bonding of a polymer film. The electrodes 44 and 46 may comprise semi-transparent metallic oxides, such as indium tin oxide (ITO). The metallic oxides may also include tin oxide, zinc oxide, indium zinc oxide, and others. Alternatively, the electrodes may comprise metal such as gold, silver, platinum, aluminum or alloys thereof. And these metallic electrodes may be coated with one or more dielectric materials to enhance reflectivity and/or bonding to a polymer film (to be discussed) or insulation films. If metallic electrodes are used, they may also comprise the reflective coating in the filter 22, thus allowing the elimination of the dielectric high reflective coatings 42 and 43. The metallic electrodes may allow for lower voltages for a comparable electric field. The reflectances of the metallic electrodes may be chosen by controlling the thickness of the electrodes. Alternatively, a combination of dielectric and metal electrodes may be used. And, in certain embodiments, index matched indium tin oxide (IMITO) electrodes may be used, where the ITO is matched to the substrate it is attached to or associated with.

Disposed on or associated with at least one of the electrodes is a variable thickness polymer film designated generally by the numeral 48. In most embodiments, the variable thickness polymer film or film is positioned on the active electrode 46. The film 48 varies in thickness according to a voltage that is applied across the electrodes 44 and 46. Accordingly, as the thickness of the film 48 decreases, a variable space 49 between the film and the facing common electrode 44 increases in thickness. Likewise, as the film 48 increases in thickness, the variable space 49 between the film 48 and the electrode 44 decreases. As such, the changing thickness of the film and the associated gap varies the optical path length between the electrodes which is:

$$\Sigma nd = n_g d_g + n_p d_p \qquad (2)$$

where $n_g$ is the refractive index of the air and $d_g$ is the thickness of the variable space or air gap; and wherein $n_p$ is the refractive index of the film 48 at thickness $d_p$. The refractive index of the film 48 will vary slightly with the variation in thickness. Indeed, the film's refractive index will vary slightly with a variation in the thickness according to $\Delta n/\Delta \tau$, wherein $\Delta \tau$ is the stress placed on the film as the film is strained by the applied electric field. Accordingly, if $\Sigma nd$ is an integral multiple of a source wavelength, the wavelength of the light will be passed. The bandwidth of the passed band will be further determined by the reflectances of the high reflective coatings 42 and 43 or however the coatings are configured in the filter 22. As seen in FIG. 1, the film 48 can be provided in an unactivated condition 50 when no electric field is applied and in an activated condition when an electric field is applied. The activated condition results in the film 48 being compressed or extended. Whether the film is compressed or elongated (also referred to as extended) is dependent on any number of factors related to the characteristics of the film. Indeed, the film 48 can have an extended activated condition 52 and a compressed activated condition 53.

As discussed previously, the modified input light 28' has a wavelength λ that is an integral multiple of the optical path length of the filter at the time the light is passed. Light that is not an integral multiple at a given time is reflected. The wavelength λ that is passed is determined by equation (1), wherein $\Sigma nd$ is the sum of the optical path lengths of the layers between the reflective surfaces 42 and 43 and where m is an integer $\geq 1$. The optical path length $\Sigma nd$ changes with the variation in thickness of the film 48. The variation of the thickness of the film is determined by the applied electric field between the electrodes which is controlled by the controller 24. Accordingly, when a voltage is applied across the film 48, the film may be caused to compress, increasing the space 49 between the spaced apart substrates. As such, the optical path length may pass one color from the light source, whereas a changed optical path length may pass another color from the light source. Indeed, at another voltage, the optical path length may create constructive interference for a bandwidth not in the light source, and thus create a dark pixel. As such, with a monochromatic light source, the filter may act as a modulator, passing or not passing light from the source. The optical path length may be configured or sized so as to destructively interfere or constructively interfere with the monochromatic light source creating digital bits of either zero or one. In other words, control of the film 48 may generate a dark pixel or a white pixel.

Depending upon the spacers and configuration of the substrates, the total distance of gap 36 between the reflective surfaces can range from under 1 µm to over 10 µm and in some cases several millimeters. In most embodiments, it is believed that the total thickness should be as small as practically possible so as to minimize the voltages needed to create the electric fields needed to vary the thickness of the film 48. A low total thickness will minimize the power consumed as well as decrease the response time of the filter. Lower voltages would also make the components in an active matrix smaller, decreasing the dark areas or inactive areas of the display. Lower total thickness will minimize overlap between modes (the integer m in Eq. 1). In broadband applications, the optimal total thickness is less than 2 µm. As will be discussed in other embodiments, the film 48 may be selectively positioned on the electrodes and pattern coated as needed so as to provide a desired light output.

In general, the polymer of the film is a soft solid that is chemically bound to the electrode surface. That is, the polymer should have a low modulus and a low tangent delta, where tangent delta is equal to Loss Modulus/Elastic Modulus. It is believed that the chemical bonding of the polymer to the electrode, as will be described, prevents the polymer from flowing or creeping with respect to the electrode and substrate. It is also believed that chemical bonding of the film to the electrodes, along with the other attributes discussed herein, will provide operational features not present in existing technology. In one or more embodiments, the modulus of the polymer is less than about 40,000 pascals. In these or other embodiments, the tangent delta is less than about 0.15. In one embodiment, the tangent delta is less than about 0.05. A polymer with a low tangent delta has low internal friction and minimizes heat generated during repeated stressing as a result of voltage applied and removed across the electrodes. The elastic modulus of the polymer of the film 48 should be low enough so that moderate voltages are needed to extend or compress the film. Chemically bonding the polymer to the plane of the electrode surface increases the response in the z-direction. Chemically bonding the polymer film to the electrode surface also prevents the sagging of the polymer film when held in a vertical position. Thin films of polymers are known to have significantly lower modulus than the bulk polymers. In most embodiments, the polymer film should be coated at as small a thickness as possible in order to minimize the modulus of the film. As noted above, embodiments that use a thickness of less than 5 µm, and even less than 1 µm are well suited for broadband visible applications. In most cases, the only bonding is of the individual chemical chains to the electrode surface. In some cases there may be light crosslinking between polymer molecules. The elastic modulus should, however, not be so great that large voltages are needed to elongate or compress the film. However, when the film is extended or compressed, the energy of compression is stored as elastic energy, which helps the polymer material restore to its original thickness when the electric field is removed or released.

Ideally, the film should undergo a maximum compression of about 50% and, more ideally, 30%. Voltages applied by the electrodes should be reversed periodically so as to extend the film every few cycles to keep the film from developing a compression set. In other words, application of a voltage of one polarity to the film causes the film to compress, and application of a voltage with an opposite polarity causes the film to elongate. The maximum extension of the film should be less than the compression, with a maximum of 30%, or more ideally, about 20%. The total thickness of the filter and the resting thickness of the film 48 can be chosen so that the smallest variation of the film thickness causes constructive interference for modes of the wavelengths of interest.

In one or more embodiments, the variable thickness polymer film (polymer film) 48 comprises an elastomeric polymer having a low glass transition temperature, low modulus, low tangent delta, high chemical saturation and sufficient light stability. In one embodiment, the film includes acrylic, polyurethane, saturated rubber such as polyisobutylene, or polysiloxane polymer, or copolymers or terpolymers thereof. Other elastomers are possible. In certain embodiments, the film includes a polymer modified to be responsive to an electric field. In one embodiment, the film includes polysiloxane.

In one or more embodiments, the polysiloxane polymer includes linear polysiloxane. Linear polydimethylsiloxane molecules have nearly zero bond rotational energy around the Si—O bond of the polymer chain, which makes the polymer very flexible. Polydimethylsiloxane polymer has a glass transition temperature of less than 120° C. Linear polysiloxane polymers that contain a low percentage of phenyl have lower crystallinity and impart even more flexibility.

Linear polysiloxane has high elongation and compressibility. Linear polysiloxane has a low modulus and a low tangent delta. Polysiloxane has a high reflection and gloss and exhibits low light scattering and low light absorbance. Polysiloxane is stable to heat and high light flux. The polysiloxane may be compounded to have a wide range of refractive indices and exhibits low birefringence. The polymer is moisture resistant and permeable to gas. Polysiloxane retains flexibility at cold temperatures.

In one embodiment, the linear polysiloxane polymer includes $Si(CH_3)_2$ groups, i.e. has two methyl groups bonded to each silicon atom. In other embodiments, one or both methyl groups may be replaced by another substituent on a low percentage (<15%) of silicon atoms. Examples of replacement substituents include, but are not limited to, phenyl groups, fluoroalkyl groups, alkyl groups containing two or more carbon atoms, and cyano groups. Substitutions may be made to change the refractive index, rheological properties, or electroactive properties. In one or more embodiments, one or more of the silicon atoms may be replaced with germanium atoms. Substituting phenyl groups for a small percentage of methyl groups both lowers the modulus and glass transition temperature as well as raises the refractive index of the polymer.

As stated above, the polymer film includes a polymer that is responsive to an electric field formed between the electrodes. In one or more embodiments, the polysiloxane polymer exhibits sufficient response to an electric field. In other embodiments, the responsiveness may be increased by the addition of one or more polar groups to the polysiloxane polymer. In one embodiment the polymer may contain, or may be modified to contain, polar groups that will be responsive to the electric field. It will be understood that polar groups include ionic groups and non-ionic polar groups. In one or more embodiments, the polymer may have pendant anions. In other embodiments, the polymer may have pendant cations. Other ionic configurations, such as zwitterions, are possible. The polymer may include non-ionic polar functional groups; and polar groups with unsymmetrical charged distributions, such as polypropylene oxide, polyphenylene oxide, or polyvinyl ethers, for example.

In one or more embodiments, the average number of ionic groups per polymer molecule is small. In one embodiment, the average number of ionic groups is up to about 1.5 per polymer molecule. In other embodiments, the number of ionic groups is less than about 1.1 per molecule. The number of polar groups should be sufficient to make the polymer chains active in the electric field, but not so high as to adversely affect the optical and rheological properties of the polymer film. Embodiments that contain non-ionic groups may contain more than one non-ionic monomer per polymer chain. In one or more embodiments, the polymer includes an average of from about 2 to about 10 non-ionic polar groups per molecule.

Ionic groups may include sulfonate, sulfate, phosphonate, phosphate, polyphosphate, carboxylate, carboxylic acid, ammonium, and others. The addition of polar and ionic groups to polysiloxane may be achieved by methods known in the art of silicone surfactant chemistry. In one or more embodiments, the behavior of the polymer film in the electric field will depend to some extent on whether the polymer has anionic or cationic functionality. If the polymer has anionic functionality, the film will compress when a positive charge is placed on the electrode to which it is bonded. The film will elongate when a negative charge is placed on the electrode to which it is bonded. If the polymer chain has cationic functionality, the film will compress when a negative charge is placed on the electrode to which it is bonded. And the film will elongate when a positive charge is placed on the electrode to which it is bonded. To obtain the maximum deformation possible, the electric field should alternate in polarity so that the polymer film is both elongated and compressed.

In one or more embodiments, the polymer includes primarily linear polymers of fairly low molecular weight, i.e. less than about 50,000 amu. In these or other embodiments, the polymer film polymer may be characterized by a fairly narrow molecular weight distribution with polydispersity less than about 1.5, where polydispersity=Mw/Mn. The molecular weight should be low enough to minimize molecular chain entanglements. The entanglement molecular weight refers to the molecular weight associated with or corresponding to a polymer chain length that is sufficiently large for entanglements to occur between molecules of undiluted polymer. This molecular weight can be experimentally derived for a polymer from the slope of a plot of log viscosity versus log molecular weight. Experimental techniques for determining the entanglement molecular weight of a polymer are summarized by W. W. Graessley in Adv. Polym. Sci., Vol. 16, 1974, and are known by those skilled in the art.

Polysiloxane polymers are liquid up to about 100,000 amu. The liquid nature of linear polysiloxane polymers is advantageous for applying the polymer to the electrode surface. The liquid polymer can be applied without solvents and then chemically bonded to the electrode surface to form a non-sagging thin film soft solid. Before coating the ionic groups on the polymer chains may be reacted with functional groups to form non-polar groups in order to modify the flow and deposition properties of the liquid polymer. After deposition and bonding to the electrode surface, the functional group may be removed and the ionic group released. For example, a carboxylic acid polar group may be reacted with a long chain alcohol to form a more non-polar ester before deposition. After deposition and bonding, the alcohol may be hydrolyzed with a mild acid to form carboxylic acid.

In other embodiments, the polysiloxane polymer chains may be grafted to low molecular weight polymers such as polyacrylate, polyether, polystyrene, polysulphone, polyurea, polyamide, polyimide, polyamide-imide, polyester, polycarbonate, epoxy resins, and others. The purpose of the grafting may be to alter the optical properties including refractive index, rheological properties, and electroactive properties. In still other embodiments, the polysiloxane chains may be bonded chemically or physically to nano particles. The nano particles may include nanoclay, activated calcium carbonate, silica, POSS, surface modified silica, and others. POSS (Polyhedral Oligomeric Silsesquioxane) is a silicate with dimensions of a few nanometers. POSS can be bonded with organic groups to change its solubility, as well as with vinyl groups that allow polymerization into the polymer chains. Linear polysiloxane with standard designations with M and D may be bonded to polysiloxane resins with standard designations of T, Q, and MQ to modify the optical and rheological properties of the polymer film.

In other embodiments, the polysiloxane may be reacted with phenyl silanes. Examples are triphenyl silane, diphenyl alkyl silane and triphenyl vinyl silane. Triphenyl silane may be reacted with vinyl groups on the polymer chains. Triphenyl vinyl silane may be reacted with hydrides on the polymer chains. One purpose of adding phenyl silanes is to increase the refractive index of the polymer film without greatly affecting the glass transition temperature, elastic modulus and tangent delta of the polymer film.

The film 48 may be applied to the electrodes by ink jet, photolithography, e-beam lithography, reactive ion etching, plasma coating, spin-on coating, extrusion (slit) coating. Ink jet deposition would be advantageous for deposition on individual active electrodes. Extrusion coating would be advantageous for continuous or semi-continuous coating or large areas such as the common electrode, as will be described subsequently. The film is then chemically bonded to the electrode via a chemical reaction. Thus, prior to the bonding, the polymer of the film includes a reactive group that is capable of reacting to form a chemical bond with either the electrode or with a coupling agent, as described hereinbelow.

It will be understood by one of skill in the art that many polymers include polymer molecules having chains. In one or more embodiments, each chain includes a first terminus (i.e. end) and a second terminus (i.e. end). The one or more polar groups are located at or near a terminus of the polymer chain. Prior to bonding with the electrode or a coupling agent, in one or more embodiments the reactive group is located at or near one end of the polymer chain, with a polar group at or near the other end. In other embodiments, the reactive group is located near the midpoint of the polymer chain, with polar groups at each end. In yet other embodiments, the reactive group is located partway along the polymer chain, and both termini of the polymer chain include a polar group. In these or other embodiments, the length of the polymer chain between the reactive group and the polar group is less than the entanglement molecular weight. It may be preferred that the reactive group is somewhat randomly positioned in the middle of the polymer molecule. This would stagger the polar groups on the free ends so that the polar groups are more separated from each other.

The electrode surface may be chemically modified to provide reactive sites for polymer bonding. The surface treatments may include etching, oxidation, plasma treating and others. The surface may be coated with a dielectric such as $SiO_2$ to provide bonding sites. The $SiO_2$ coating may be acid etched to increase reactive sites. After etching, the surface should be dried to an anhydrous condition. Coating with $SiO_2$ has other advantages such as insulating the electrode. This would be especially advantageous if metallic electrodes such as aluminum are used.

The reactive groups on the polymer include, but are not limited to silicon hydroxy (Si—OH), silicon hydride (Si—H), silicon alkoxy, silicon chloride and others. The reactive group could include functional groups that would allow bonding using UV or e-beam radiation.

In one embodiment, where two polymer film layers are used in a filter element, their polarities need to be reversed. If the polymer film applied to the active electrode is anionic, the polymer film applied to the common electrode may be cationic. If the polymer film applied to the active electrode is cationic, the polymer film applied to the common electrode may be anionic. If two polymer film layers are employed, the variation in thickness in the two films that is required to produce light filtration across a broad range of wavelengths may be decreased from that needed when only one polymer film is utilized.

When light filtration across a broad range of wavelengths is desired, as in direct view displays, the refractive index of the polymer film should be as high as possible. In certain embodiments, a higher refractive index allows the total deflection of the polymer film to be made smaller while still achieving filtration across the wavelength range. In applications with monochromatic light sources, a polymer film with a lower refractive index may be preferred. In certain embodiments, a lower refractive index will allow better control of subtle phase shifts and allow easier modulation between total constructive and total destructive interference. It is advantageous to avoid a refractive index modification that causes a significant increase in the tangent delta of the polymer film. The refractive index of the polymer should be matched as much as possible to the electrode or other surface to which it is bonded.

Figure 2:
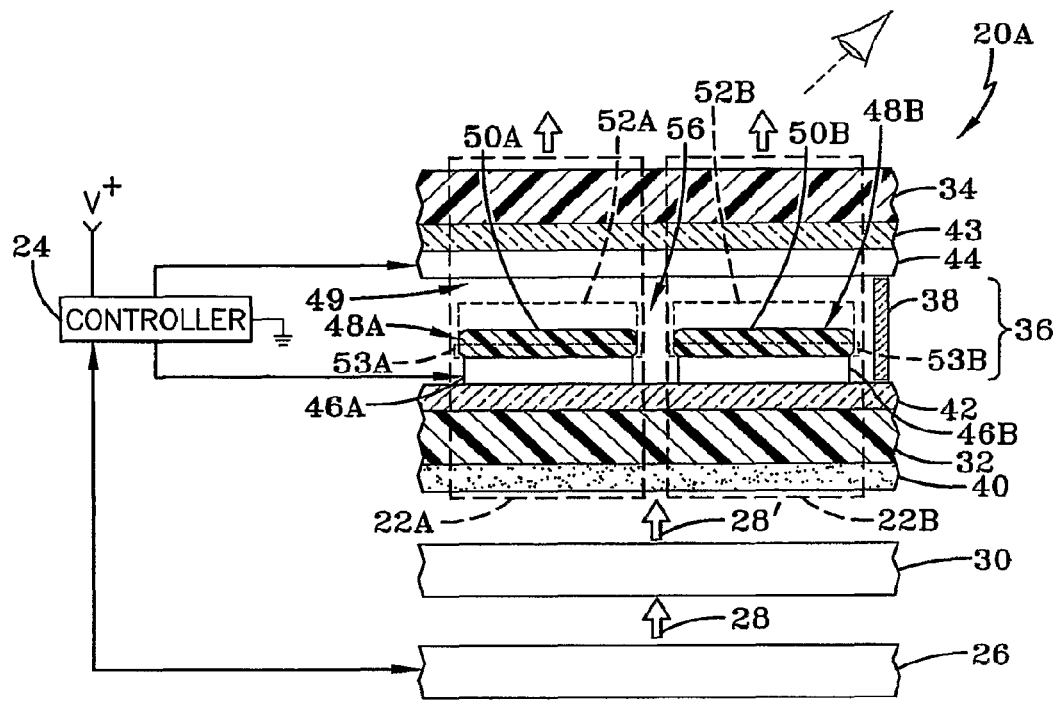
FIG. 2 is a schematic diagram of a light modulator providing two transmissive filter elements of an array according to the present invention.
Figure 15:
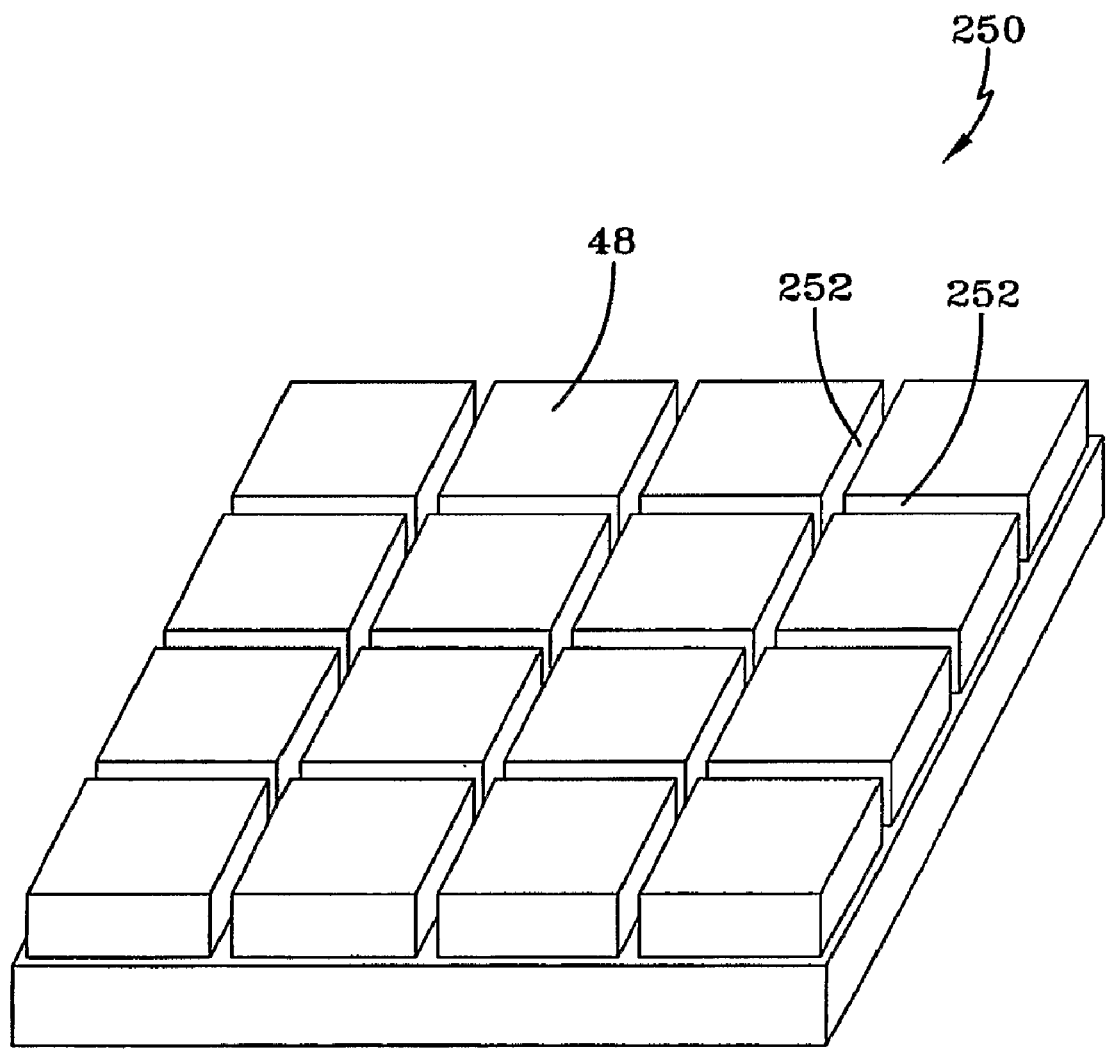
FIG. 15 is a schematic perspective diagram of an electrode surface of a light modulator with a polymer film filter element with grids allowing for expansion of the polymer film according to the concepts of the present invention.

The modulus of the polymer film should be low enough that the change in the refractive index with the stress induced by the electric field is not too large. In applications where the electrode area is small, in projection display light valves for instance, when compressed, the polymer film can expand. FIG. 2 shows electrodes 46A and 46B where a space 56 is provided to allow the polymer film to expand when compressed by the electric field. In applications where the area of the filter is large compared to the thickness, as in a large direct view display, the polymer film may be pattern coated within the filter 22 to provide areas where the polymer film can expand when compressed. As seen in FIG. 15, areas 252 allow for expansion between polymer film 48 components. The width of the space 252 should be less than a wavelength of light (50 nm to 400 nm). The rows may be staggered to minimize continuous stripes of uncoated area. The expansion areas may be created by pattern coating an alkyl capped silane under anhydrous conditions. The alkyl groups (methyl, ethyl, etc.) cap off reactive sites on the electrode surface where the polymer cannot bond when it is coated on the polymer surface. The alkyl based silane also provides a non-polar inert surface that prevents interaction of ions or polar groups in the polymer chains from interacting, perhaps irreversibly with the electrode surface. Other areas of the filter that may come in contact with the polymer or polymer film may be similarly capped.

In one embodiment, the polymer film may be applied to the electrode or electrodes in a series of steps. In a first preparatory step, the alkyl silane capping agent is pattern coated onto certain areas of the electrode, the areas delineated by 252 of FIG. 15. These areas will be unreactive in subsequent steps, and will therefore create expansion areas for the polymer film. In a subsequent step, the electrode substrate is coated with a silane coupling agent, which chemically bonds' to the electrode where the capping agent is not present. In a third step, an elastomeric polymer is applied and chemically bonded to the coupling agent. In one embodiment, where the elastomeric polymer is capable of bonding directly with the electrode, the coupling agent may be eliminated.

The capping agent used in the first preparatory step includes a group capable of reacting to form a bond with the electrode. The capping agent, once bound to the electrode, does not contain any group capable of reacting with the polymer that is subsequently applied to the electrode to form the polymer film. In other words, the capping agent reacts with the electrode substrate to form a patterned coating over certain areas of the substrate that will be unreactive to the polymer. Examples of capping agents include compounds represented by the formula

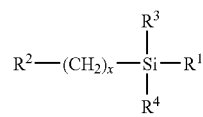

where $R^1$ is selected from alkoxy groups, $R^2$ is an alkyl group, $R^3$ and $R^4$ are independently selected from alkoxy, methyl, or other alkyl groups, and x is an integer from 0 to about 18. If $R^1$, $R^3$ and $R^4$ are all three alkoxy, methoxy for instance, the silane may form a monolayer under anhydrous conditions. The preferred configuration, however, is a monoalkoxy where $R^3$ and $R^4$ are methyl groups and $R^1$ is an alkoxy. This type of silane gives a stable monomeric monolayer under anhydrous deposition.

The coupling agent includes alkoxyl groups, or other groups capable of reacting to form a bond with the electrode substrate, and a functional group capable of reacting to form a bond with the polymer that is subsequently applied to the electrode to form the polymer film. In one or more embodiments, the functional group is a vinyl group. In one embodiment, the coupling agent includes compounds that may be represented by the following formula

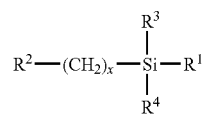

where $R^1$ is selected from alkoxy groups, $R^2$ is a vinyl group, $R^3$ and $R^4$ are independently selected from alkoxy, methyl, or other alkyl groups, and x is an integer of from 0 to about 10. Both the silane capping agent and the silane coupling agent are best applied under anhydrous conditions that create a monolayer. If $R^1$, $R^3$ and $R^4$ are all three alkoxy, methoxy for instance, the silane may form a monolayer under anhydrous conditions. The preferred configuration, however, is a monoalkoxy where $R^3$ and $R^4$ are methyl groups and $R^1$ is an alkoxy. This type of silane gives a stable monomeric monolayer under anhydrous deposition. Trialkoxy silane coupling agents produce polymeric multilayered structures under hydrous conditions.

As stated above, in one or more embodiments the coupling agent includes alkoxyl groups, or other groups capable of reacting to form a bond with the electrode substrate, and a functional group capable of reacting to form a bond with the siloxane polymer that is subsequently applied to the electrode to form the polymer film. The polymer, prior to reaction, includes a reactive group that is capable of reacting with the coupling agent. For example, where $R^2$ of the coupling agent is a vinyl group, it can react with a silicon hydride group on the siloxane polymer chain. Other combinations of functional groups on the silane coupling agent and the siloxane polymer are possible.

The order in which these bonds are formed is not particularly limited. Thus, in one embodiment a siloxane polymer is reacted with the coupling agent after it is bound to the electrode. In another embodiment, the coupling agent may be reacted with the polymer before the coupling agent is applied to and bonded with the electrode. In one or more embodiments, the reaction may be an addition cure, catalyzed by platinum (Pt) or rhodium (Rh). The cure may be induced by UV radiation, and may involve either cationic or free radical species. The cure may be through electron beam (EB) or reactive ion itching.

In another embodiment, as stated above, the coupling agent may not be necessary. That is, a low molecular weight dimethylsiloxane polymer that includes a reactive group may be bonded directly to the electrode. In these or other embodiments, the polymer may be chemically bonded to the electrode via a condensation reaction, involving hydroxyl or other reactive groups.

For purposes of this specification, the term chemically bonded will be understood to also include electrostatic attractions and hydrogen bonding.

Skilled artisans will appreciate that a number of different embodiments can be configured based upon the embodiments shown in FIGS. 1 and 2. And from these different embodiments, a number of end-use devices can be improved upon by use of the disclosed technologies. Indeed, as seen in at least FIG. 3, multiple filters can be configured on the facing substrates so as to provide a matrix of filters. An exemplary matrix of filters can be configured for any conceivable end use appreciated by a skilled artisan. Although a number of embodiments are presented herein, they should not be construed as limiting.

In another active matrix embodiment, a light modulator designated generally by the numeral 20A is shown in FIG. 2. The modulator 20A, wherein the alphabetic suffix is an indication of an embodiment with a variation of some type, includes an electrode 44 that is a common electrode of an array so as to provide a common reference voltage. Active electrodes 46A and 46B may be controlled by an active matrix addressing scheme that is generated by the controller 24. Indeed, a number of active electrodes 46 may be provided, all of which are connected to the controller 24. It will further be appreciated that a space 56 may be provided between each of the active electrodes 46A and 46B so that thin film transistors, addressing lines, storage capacitors and the like may be associated therewith. Alternatively, in a single filter, or where a relatively small number of filter elements in an array are used, a segmented voltage control, where the voltages are applied directly to the electrodes by the controller may be used. In some embodiments, a passive matrix control may be used.

Figure 3:
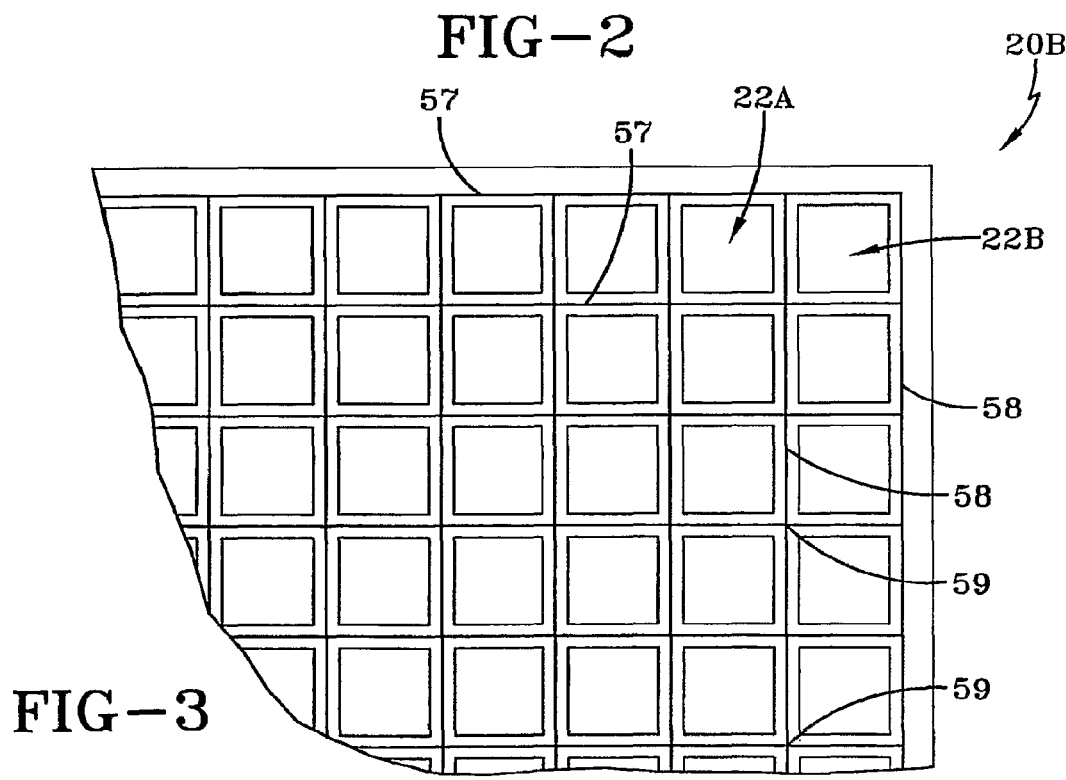
FIG. 3 is a schematic diagram of a light modulator comprising a two-dimensional array of transmissive filter elements in accordance with the concepts of the present invention.

An exemplary modulator designated generally by the numeral 20B is shown in FIG. 3 and comprises an array of filters 22A and 22B and as many as are needed in an end-use application. As can be seen, the array comprises a plurality of filters 22 arranged in a matrix of rows and columns. A network of row select and data lines 57 and 58 supply a voltage to each filter 22 as deemed appropriate by the controller. Surrounding each filter 22, or picture element, is an electronics area 59 which typically receives input or control signals from the data lines. The area 59 typically receives input or control signals from row select and data lines. The area 59 may also provide for a location of additional electronic elements that control operation of each respective filter.

Figure 4:
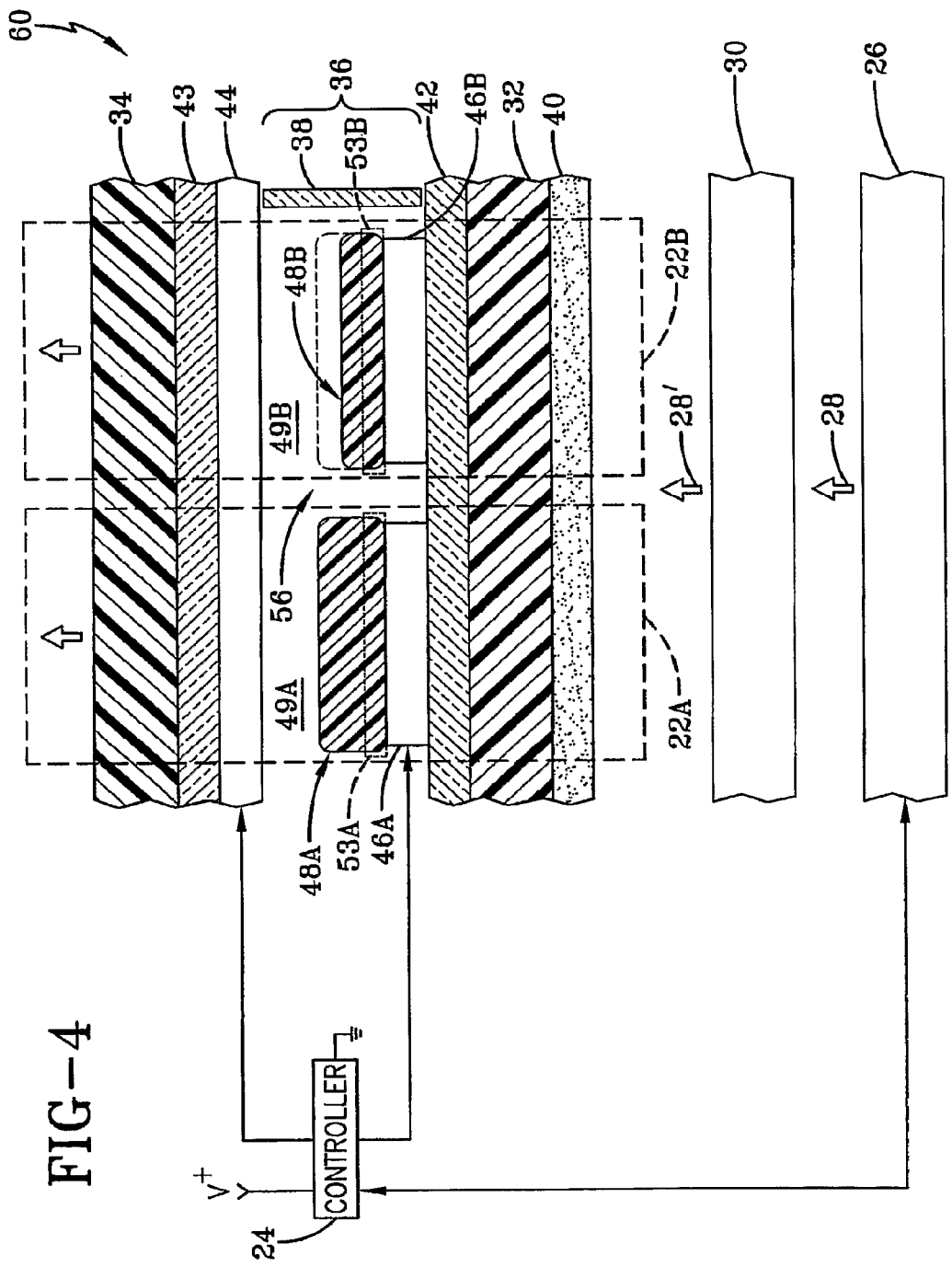
FIG. 4 is a schematic diagram of a light modulator providing two transmissive filter elements showing a variation in a thickness of a variable thickness polymer film according to the concepts of the present invention.

FIG. 4 shows two filter elements 22A and 22B in an array designated generally by the numeral 60. When configured in this manner, each film forms a pixel, also referred to as a picture element, or a defined filter in the array. Specifically, an active electrode 46A is coated with film 48A, forming gap 49A. An active electrode 46B is coated with film 48B, forming gap 49B. In this embodiment electrode 46A has a resting voltage with a resting thickness for film 48A. Electrode 46B has voltage applied, which creates an electric field between electrode 46B and common electrode 44. In this embodiment, application of the electric field causes the film 48B to compress, increasing gap 49B. The optical path length of filter 22A may pass one color from the light source. The optical path length of filter 22B may pass another color from the light source. At another voltage, the optical path length of filter 22B may create constructive interference for a bandwidth not in the light source and thus create a dark pixel. With a monochromatic light source, the filter may act as a modulator, passing or not passing light from the source. The optical path length of filter 22A may destructively interfere or constructively interfere with the monochromatic light source, creating digital bits zero and one.

The total distance between the reflective surfaces 42 and 43 can range from under 1 μm to over 10 μm, and in some cases several mm. The total thickness should be as small as practically possible to minimize the voltages needed to create the electric fields needed to vary the thickness of the films 48A and 48B. Low total thickness minimizes the power consumed as well as decreasing the response time of the filter. Lower voltages also make the active matrix components smaller decreasing dark areas in a display. Lower total thickness minimizes overlap between modes (the integer m in Eq. 1). In a broadband application, the optimal total thickness is less than 2 μm.

Figure 5:
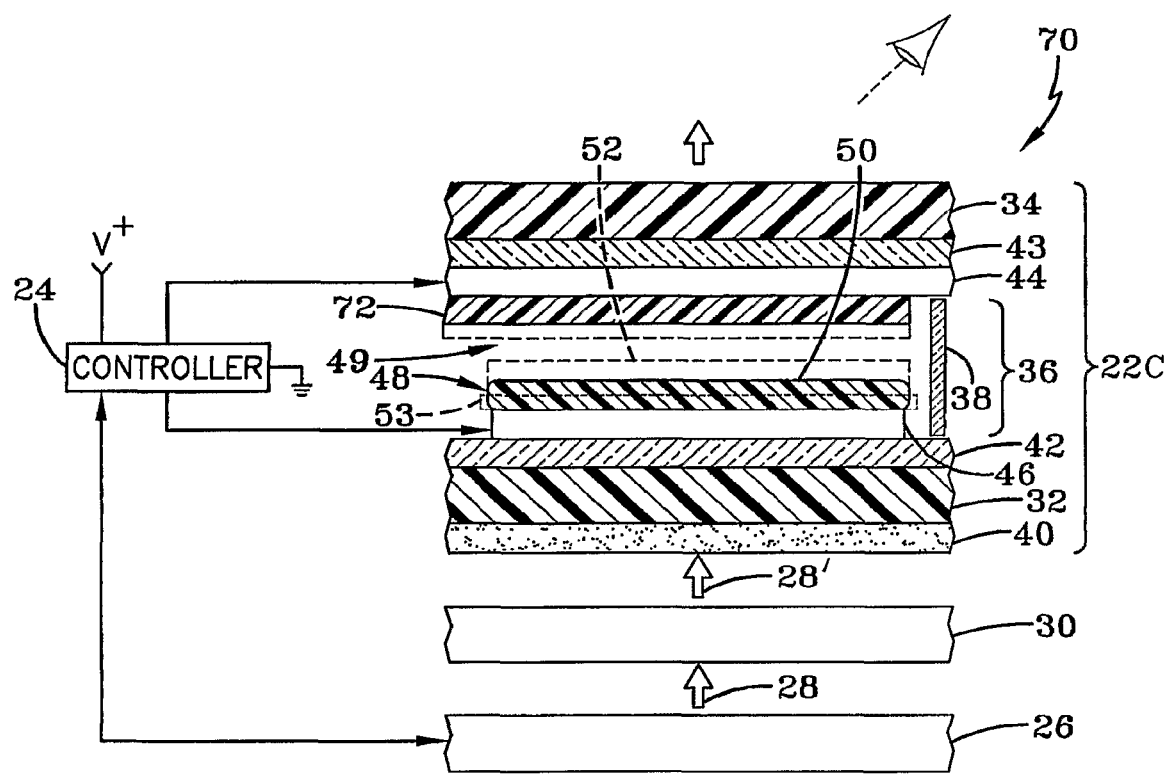
FIG. 5 is a schematic diagram of a light modulator with a transmissive filter element wherein the element contains a variable thickness polymer film associated with each substrate according to the present invention.

Referring now to FIG. 5, it can be seen that an alternative light modulator is designated generally by the numeral 70. As shown, the modulator 70 provides only a single filter 22C, but an array with multiple filters 22C could be used. This embodiment is similar to the modulator shown in FIG. 1, except that a variable thickness polymer film 72, which has the same characteristics as film 48, may be coated on the common electrode 44, and, as before, the film 48 is pattern coated on the active electrode 46. If a variable thickness polymer film is coated on both electrodes, the polymer film layers will have opposite polarity as will be discussed subsequently. This embodiment allows for finer control of the optical path length and potentially improved response times.

Figure 6:
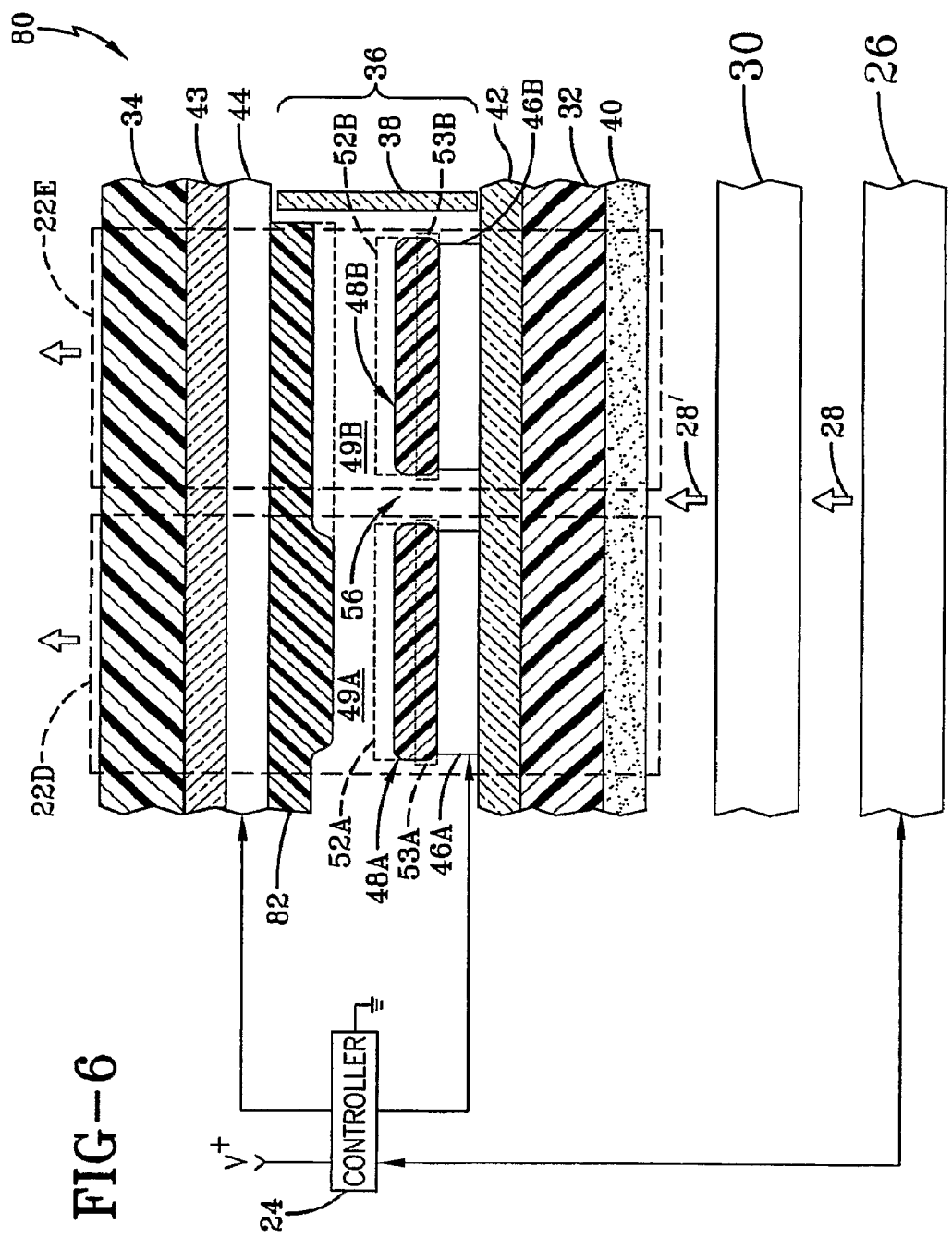
FIG. 6 is a schematic diagram of a light modulator providing two transmissive filter elements with variable thickness polymer films coated continuously on a common electrode according to the concepts of the present invention.

Referring now to FIG. 6, it can be seen that another light modulator is designated generally by the numeral 80. As shown, the modulator 80 provides two filters designated by the numeral 22D and 22E, but a single filter or an array of filters could be used. In this embodiment, a variable thickness polymer film 82, which has the same characteristics as film 48, is associated with the common electrode 44. Specifically, FIG. 6 shows the film 82 coated as a continuous layer or semi-continuous layer on the common electrode 44. The localized electric field created between electrodes 44 and 46 extends or compresses the film 82 in a manner previously discussed. The space 56 between electrodes 46A and 46B provides an area for the film 82 to transition in thickness between the electrodes. In other words, when a voltage is applied across common electrode 44 and active electrode 46A, but not across electrode 44 and electrode 46B, an angular transition is formed in the film 82. As such, the film 82 is shown in an extended activated condition on juxtaposition to film 48 A and in an unactivated condition in juxtaposition to film 48B. This transition from where the film expands to areas where the film does not expand, which might otherwise provide an undesirable change in the optical length, is diminished in view of the gap 56.

Figure 7:
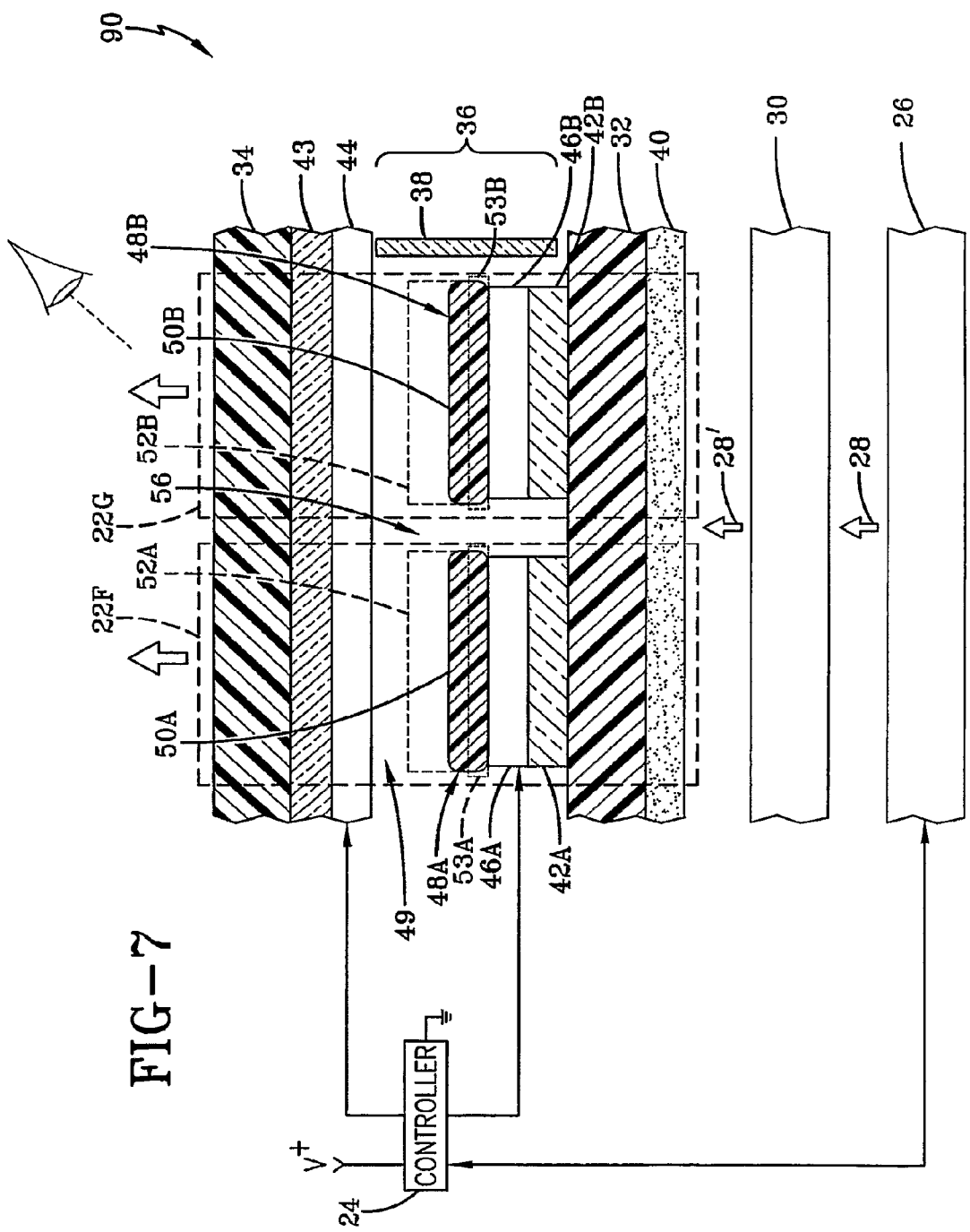
FIG. 7 is a schematic diagram of a light modulator showing two transmissive filter elements with high reflective coatings disposed on an active electrode according to the concepts of the present invention.

In another embodiment, shown in FIG. 7, a light modulator is designated by the numeral 90. In this embodiment, the modulator 90 provides two filters designated as 22F and 22G. In this variation, instead of applying the high reflective coating to an entire surface of the substrate, the HR coatings 42A and 42B are coated directly on corresponding electrodes 46A and 46B. In other words, the filter 22F includes coating 42A, electrode 46A and film 48A; and filter 22G includes coating 42B, electrode 46B and film 48B in addition to the other components previously discussed. Of course, other combinations of electrodes, reflective coatings and polymer film layers within a modulator are possible.

Figure 8:
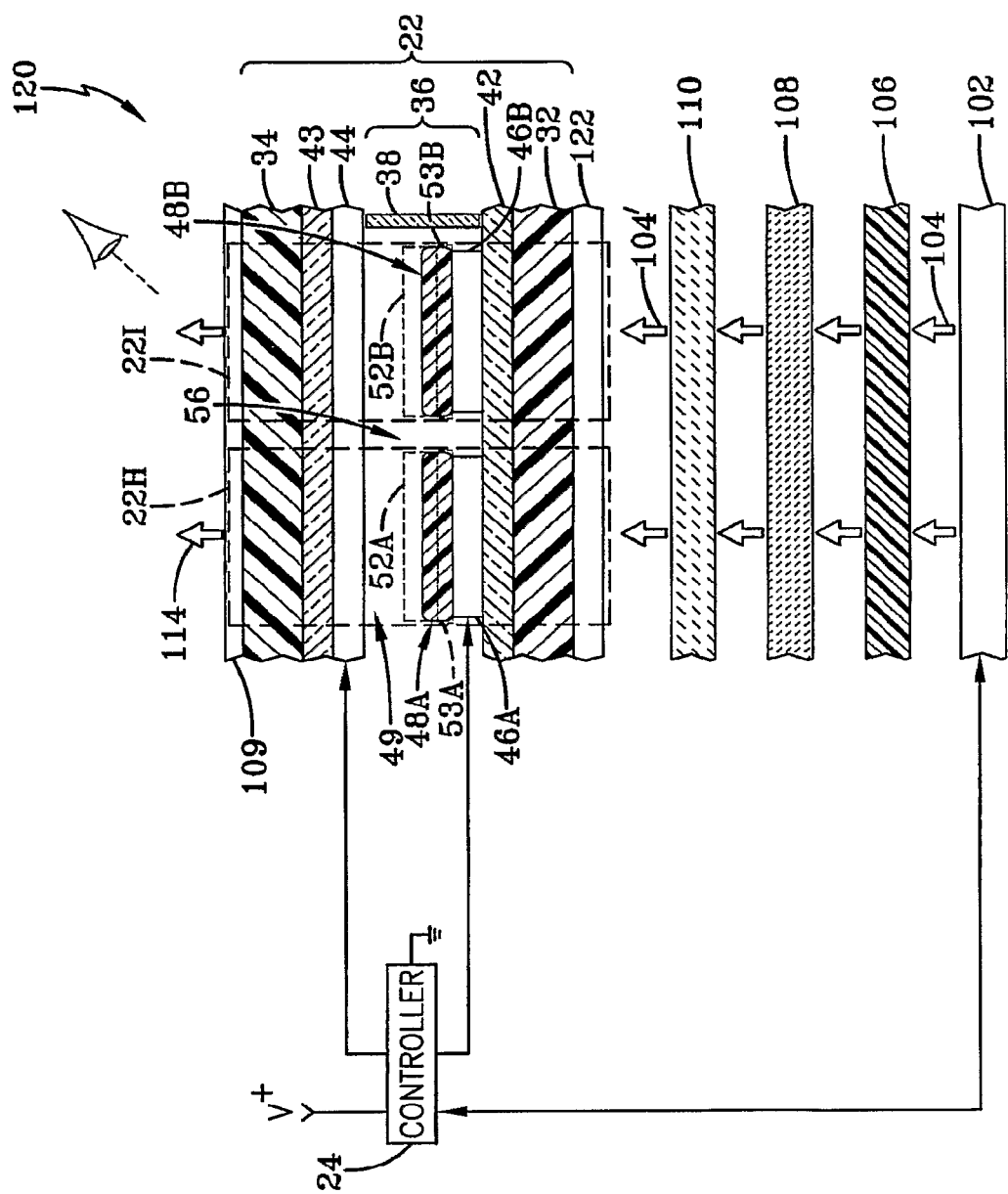
FIG. 8 is a schematic diagram of a light modulator utilizing two transmissive filter elements as part of an array of a direct view display according to the concepts of the present invention.

Referring now to FIG. 8, it can be seen that a direct view light modulator is designated generally by the numeral 120. In this embodiment, the modulator may be edge lit or back lit, as is typical for direct view displays such as computer monitors, televisions and portable devices. A light source 102 may be cold cathode fluorescent, hot cathode fluorescent, xenon flat lamp or other white light source. An optimal light source is a plurality of LEDs with three or more colors, including the primary colors red, blue and green. Other colors may be chosen. Other colors outside the gamut of the three primaries may be added to increase the gamut of the display, for instance, violet, deep red, or orange. Colors that are inside the gamut of the primaries may also be added. The LEDs should have a fairly narrow bandwidth, especially if more than three colors are utilized, preferably 20 nm to 60 nm. There should be dark areas in the total spectrum to allow the filters 22A and 22B to create constructive interference in a dark bandwidth of the spectrum to create a dark pixel.

Light 104 generated by the source 102 passes through diffuser 106 and an optional filter 108. The diffuser 106 mixes the light colors and creates a uniform distribution of light across the filter(s) 22. The diffuser 106 may be polymer film, holographic or any other commonly used diffusers. The optional filter may remove unwanted wavelengths, such as UV and IR from visible light. It may also clean up the output spectrum of light source 102. In particular, the filter 108 may clean up areas of the spectrum between the primary color bandwidths. It may supply a sharp cutoff at a particular wavelength, 660 nm, for instance, where dark pixels can be created. This will help increase the contrast of the modulator 120.

Since the filters 22H and 22I are configured as an interference filter, it requires that the viewer be decoupled from the cells. Otherwise the optical path length will vary with the viewer's angle. This can be accomplished with one or more diffusing films 109 placed on an outer surface of substrate 34 of FIG. 8. The diffusing films can be any of standard holographic, microreplicated, and other diffusing films. Alternatively, the outer surface of glass 34 may be ground to create diffusion. In lower cost displays, where viewing angle is not important, no diffusers may be used. Another advantage of diffusing films is to provide a matte look and decrease specular reflection from reflective layers with the pixels. Alternatively, substrate 34 may be in the form of a fiber optic faceplate.

Since the filters 22H and 22I are configured as an interference filter, it requires a fairly narrow range of input angles. A light direction film 110 directs modified light 104' into a narrow range of angles before entering the filters 22 of the modulator. The light direction films may include one or more 3M BEF, IDF, TRAF films, as well as holographic films. Alternatively, a rear fiber optic faceplate 122 may take the place of antireflective layer of FIG. 8. The fiber optic faceplate 122 directs the backlight into a narrow cone. A collimated backlight may also be used.

As discussed previously, light 104' enters the filter elements of the array. The light 114 that exits each filter element is colored depending on the optical path length set for each filter at a particular time. The optical path length of each filter element is electronically set to pass one of the three or more wavelengths of source 102. The optical path length of each filter element is determined by the thickness of the corresponding film 48, which is controlled by the localized electric field formed between active electrode 46 and common electrode 44. The optical path length of each filter element is set via the voltage to pass one of the colors of the light source 102 at a given time. Light that is not passed is reflected. For instance, if the light source 102 consists of RGB LEDs, and the optical path length of a filter is set to transmit blue, the filter will reflect red and green. If the optical path length of the filter is set to transmit green, the filter will reflect blue and red. If the optical path length of the filter is set to transmit red, the filter will reflect green and blue. The reflected light passes back through the light direction film 110, back to the diffuser 106, where the light is reflected back to the array of filters until it encounters a filter that is tuned to pass the particular wavelength. Light is recycled until it is used.

Dark pixels are created by tuning the optical path length of a filter 22 to pass a wavelength that is not in the spectrum of the light source 102. For instance, if light source 102 is RGB LED, the wavelength of the dark pixel can be set between the red and green or the green and blue bandwidths as long as the wavelength is in a clean area outside the baseline wavelengths of the colors. If a more broadband light source is used, the dark pixel can be set at a wavelength above or below the bandwidth of the source, above 400 nm or below 700 nm, for example. Filter 108 can cut off the spectrum below 660 nm and the dark pixel set at 700 nm, for instance. Filter 108 can also clean up the spectrum and provide a dark baseline between red and green or green and blue, for instance. If a cold cathode fluorescent or other light source that employs excited phosphor as a light source, the filter 108 can clean up an area in the bandwidth outside of the primary emission bands.

A palette of colors can be created by rapidly cycling each filter 22 through the primary colors of the light source. The viewer will see a time average color. Including the dark pixel wavelength in the pixel color cycling can control the contrast of the displayed colors. Each pixel will appear as a time average solid color. The colors can smoothly change from one color to another by subtle changes in the filter timing. White light can be created by cycling between complementary colors, red and green or blue and yellow or cycling between red, blue and green with equal periods. Grey can be created by cycling through equal parts of red, blue and green with varying periods of black.

It is believed that high resolution and better picture quality can be achieved by the elimination of sub pixels because the electronics of each pixel can be reduced by two-thirds. The pixels can assume a square shape in which there is a wider aperture and less dark matrix in each pixel, and the screen door effect that is typical of LCD and plasma displays is reduced thereby improving picture quality.

Because the filter array creates pure spectral colors, the gamut of the display is greater than typical LCD, which rely on fairly unsaturated absorption filters. This leads to washout of colors at higher light intensity levels. The human eye varies in response to different colors. The eye is much more sensitive to yellow and green than to red and blue. It is least sensitive to blue. Standard LCD screens with red, green, and blue sub-pixels in the standard stripe configuration cannot easily compensate for or exploit these differences in perception.

One skilled in the art can appreciate that a number of variants can be constructed. A pixel may be comprised of two subpixels where one subpixel changes between red, green, and black while the other subpixel changes between yellow, blue, and black. Alternatively, three subpixels may be used, as in standard displays, where the first pixel changes between red and black, the second between green and black and the third between blue and black. An array of filters can be used in parallel with an LCD matrix, where the LCD matrix varies the light throughput and the disclosed array acts simply as a color filter. The filter array may be used with a field sequential pulse backlight.

The filters described above can be used in a number of different applications, some of which are described herein. In one embodiment, as seen in FIG. 9, a camera system is designated generally by the numeral 130. The camera, or any other optical imaging equipment, passes the observed light through a lens system 132. After passing through the lenses of the lens system, the light is projected through an array of filters, designated by the numeral 134, wherein the array comprises a light modulator with any of the filters as described above with any number of picture elements. Light is transmitted through the array of modulators onto a light recording matrix designated by the numeral 136, such as CCD or CMOS. The camera may record a still image or a moving video. The array 134 collects a wider gamut of color than absorbance filters currently in use. The CCD or CMOS can essentially be monochromatic and the color filtering can be chosen according to the needs of the photographic device.

The filters 22 of the array cycle through a series of colors. The array may cycle through red, blue and green, for instance. If a CCD or CMOS array that may be associated with the modulator 20B is less sensitive to red or blue, for example, the filters can be programmed to collect more light from these wavelengths than from green. A matrix array of modulators 20B may be chosen or one set of pixels may collect red and green and another set of pixels collect blue and yellow.

In other applications, it will be appreciated that the filter 22 as shown in FIG. 10, or the array 134 shown in FIG. 11 may be coupled to fiber optic inputs. In FIG. 10, a single fiber optic input 150 may provide an input light to the filter 22, which may be in the form of any of the filters described herein, which then generates an output light that is coupled to a single fiber optic output 152. Likewise, in a manner similar to that shown in FIG. 11, multiple fiber optic inputs 150A-D are associated with an array 134 with any embodiment of filter 22 which is also associated with a corresponding fiber optic output 152A-D. Use of fiber optic inputs and outputs with a single filter or an array of filters allows for fast switching using a relatively inexpensive configuration. The embodiments described can be used as a tunable filter and optical modulator in wavelength division multiplexing (WDM) and data bus applications.

By varying the optical path length of the filter or an array of filters, optical tuning can be obtained over a wide wavelength range. These embodiments allow the tuning to a particular wavelength of a multiplexed optical signal. Light from a monochromatic source can be modulated into a series of ones and zeros for digital data transmission.

Figure 12:
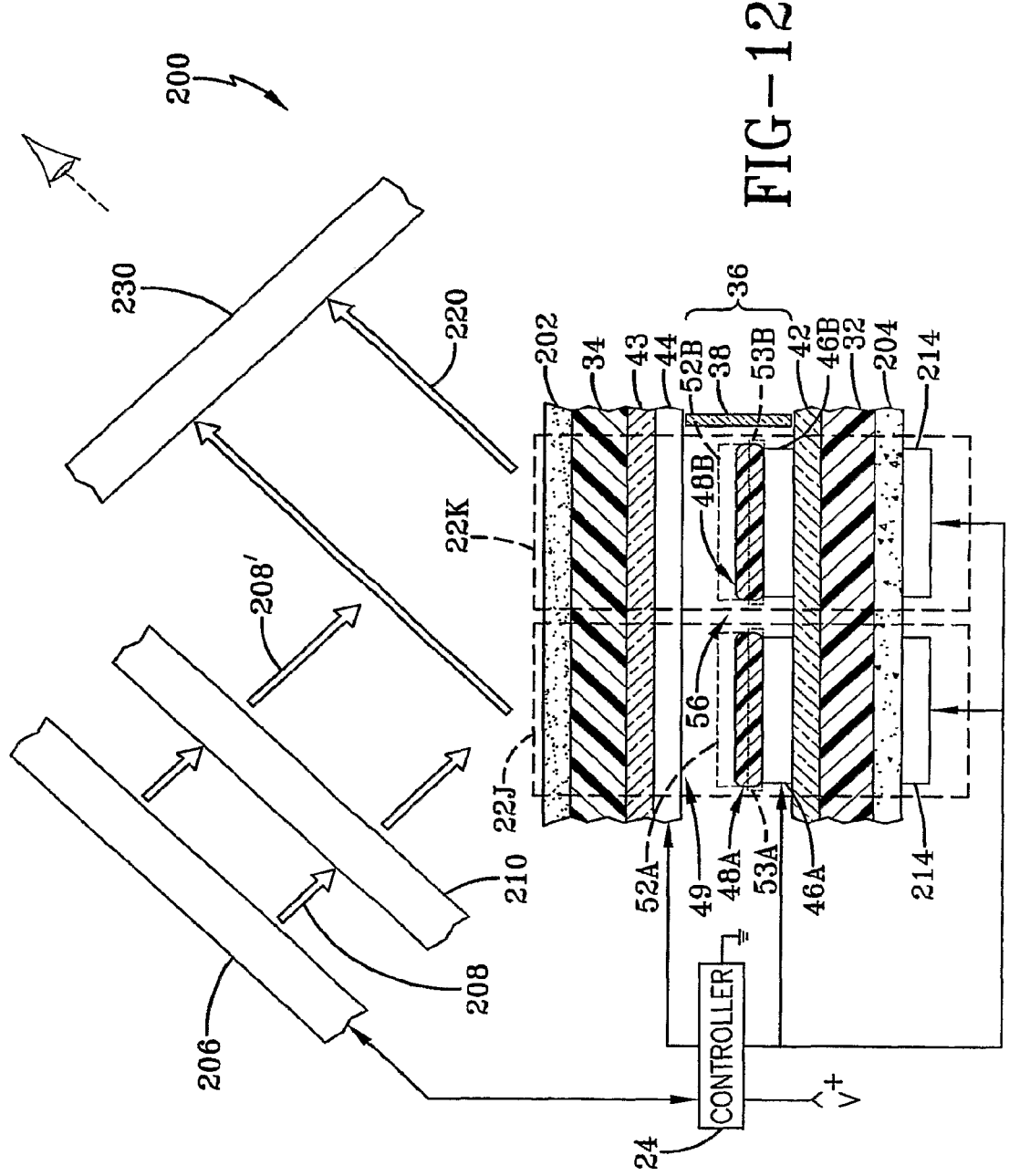
FIG. 12 is a schematic diagram of a light modulator with an array of transmissive filters coupled to or associated with a plurality of fiber optic inputs according to the concepts of the present invention.

The previously described embodiments are transmissive, wherein bright bands appear on a dark background. However, it will be appreciated that the described filters can also be used in reflective mode. FIG. 12 shows two filters 22J and 22K utilized in a reflective configuration. The filters may be a single unit or, more preferably, an element of an array. The array can be one or two dimensional.

The configuration shown in FIG. 12 is for a reflective modulator designated generally by the numeral 200. The modulator 200 is constructed in a manner similar to the transmissive modulator shown in FIGS. 1 and 2; however, several changes to the overall construction are provided so as to provide a modulator that is reflective instead of transmissive. The modulator 200 is controlled by a controller 24 as in the previous embodiments. The significant changes to the modulator are in the use of an anti-reflective coating 202 on the substrate 34 which faces the light source. The anti-reflective coating 202 is constructed of the materials as previously discussed for the anti-reflective layer 40. Another difference between this construction and the previous embodiments is the use of an absorption layer 204 on the substrate 32 opposite the substrate 34 with the anti-reflective coating. Although the electronics associated with each variable thickness polymer film 48 may be in close proximity, it will also be appreciated that control electronics 214 may be mounted on the absorption layer 204 to control the activation and deactivation of the voltage across the electrodes using appropriate electronics.

Light source 206 may be broadband, multiple discrete, or broad or narrow band monochromatic. The source 206 may be visible, NIR, IR or UV. The source may be standard metal halide or mercury arc or, more preferably, light emitting diode (LED) of three or more colors with fairly narrow bandwidths. Monochromatic sources may include LED or laser. Broadband UV/visible or IR light sources may be used in spectroscopic applications.

The light source 206 may be oriented at an angle 0° to 90° to the modulator or, in other embodiments, between 10° and 60°. An optics system 210 collimates input light 208 generated by source 206. The optics system can also filter out unwanted wavelengths, UV and IR from visible, for instance. Dichroic mirrors may also be used as part of the optics system 210. The optics system 210 may also filter wavelengths where dark pixels may be formed. Input light 208' enters filters 22J and 22K. The light source 206 generates an input light 208 which has a wavelength λ such that the optical path length of the filter 22 is an integral multiple of the wavelength at a given time. The light that is reflected is determined by an $$\Sigma nd \cos \theta = m\lambda/2 \tag{3}$$

Σnd is a sum of the optical path length between reflective surfaces 42 and 43, m is an integer ≧1, θ is the angle from the perpendicular light 208' strikes the filters 22, Σnd changes with the variation in thickness of the polymer film 48. The variation in thickness of polymer film 48 is determined by the localized electric field formed between electrodes 44 and 46.

The voltage between electrodes 44 and 46 is controlled by the microprocessor control system 24. Light that is not reflected is absorbed by the filter(s).

Figure 13:
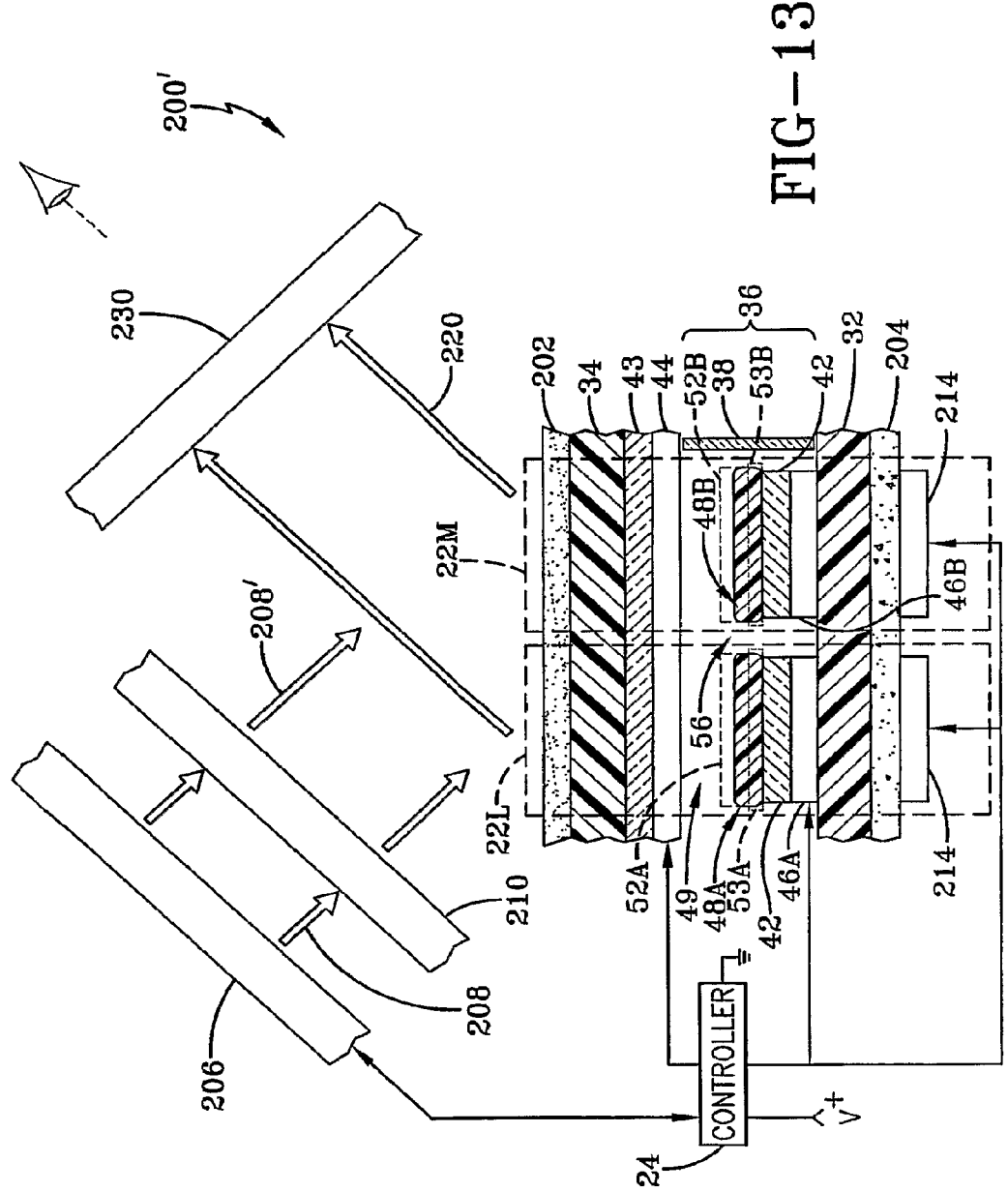
FIG. 13 is a schematic diagram of a light modulator utilizing two filter elements wherein the modulator is utilized in a reflective filter array.
Figure 14:
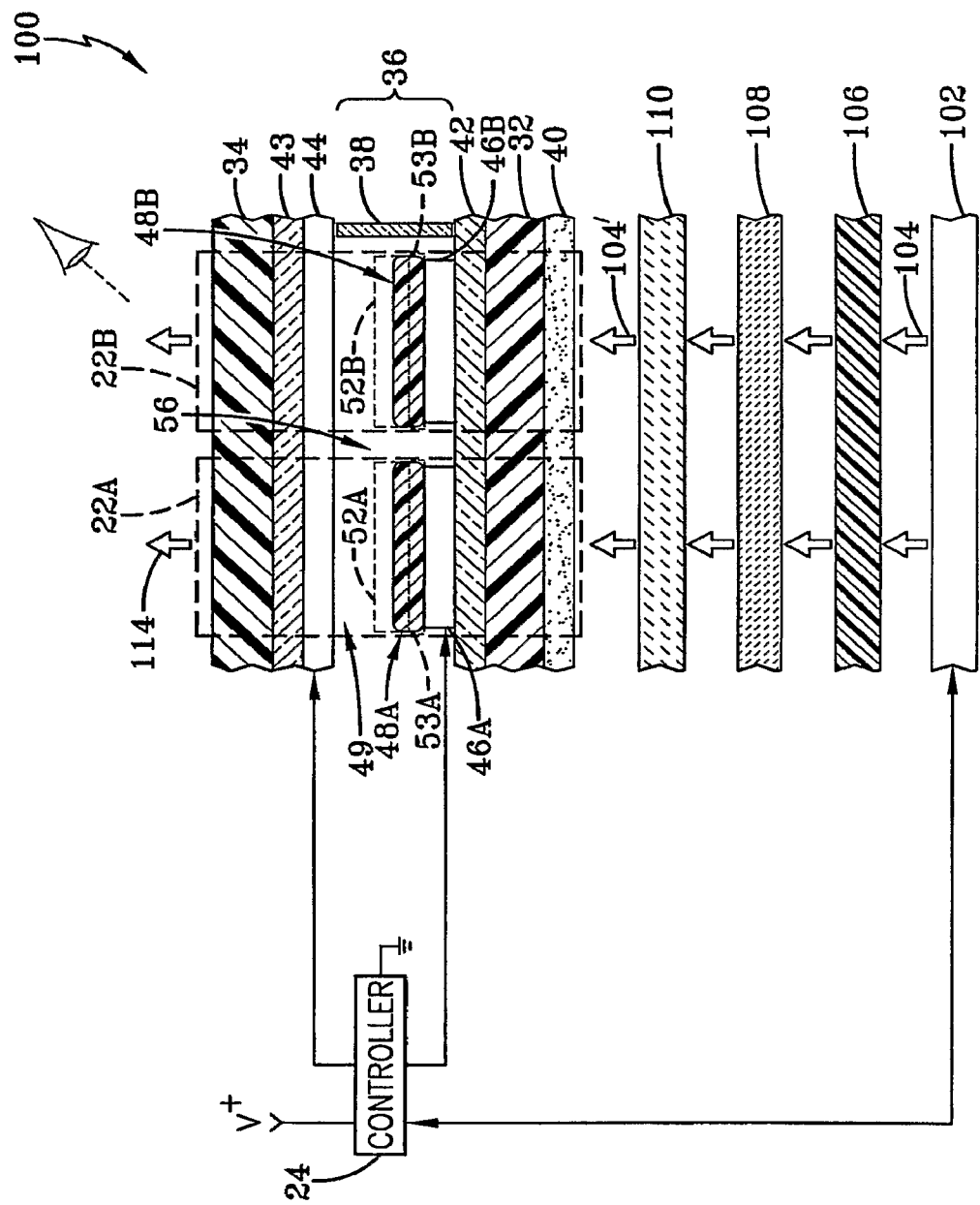
FIG. 14 is a schematic diagram of a light modulator utilizing two filter elements and part of a third filter element in a reflective array with a high reflective film coated on the electrodes according to the concepts of the present invention.

Modified light 208' enters the filters 22. As before, the filter(s) are structurally built on optically clear substrates 32 and 34. Substrate 32 can also comprise silica, silicon, or other semi-reflective substrate. Substrate 32 is coated with a dielectric high reflective coating 42. The high reflective coating may comprise an alternating stack of high refractive index and low refractive index films. Coating 42 may also comprise a combination of dielectric HR film with a reflecting and absorbing metallic film. The metallic film may comprise aluminum, silver, gold, platinum, or other suitably reflective metals. Alternatively, as seen in FIG. 13, the HR coating associated with specific pixels may be coated on the active electrode 46.

Substrate 32 can have an absorption layer 204 bonded to it. The absorption layer will absorb light that is transmitted through substrate 32. The absorption layer 204 may be bonded continuously or bonded in a pattern in areas that transmitted light will penetrate, which is dependent on pixel element location and the angle of light source 206. The substrate 32 may also have an attached control area 214 which may contain transistors, storage capacitors and other electronics as an alternative to placing electronics in space 56 between elements of the array. Placing the electronics in control area 214 instead of space 56 allows the film 48 components of the array to be placed closer together. Each control area 214, which works in tandem with the electrode(s), is connected to the controller 24.

The substrate 34 is coated with anti-reflective film 202. The anti-reflective film 202 may be optimized across the wavelength range for a broadband source. In monochromatic applications, it may be optimized for the particular wavelength of the light source. In applications with light sources that have multiple discrete colors, the AR coating may be optimized for the individual wavelengths. The opposite side of substrate 34 is coated with a high reflective dielectric coating 43. The dielectric coating comprises alternating layers of high refractive index and low refractive index films. Alternatively, as seen in FIG. 13, the HR coating 42 may be coated on the active electrode 46. As such, modulator 200' utilizes filters 22L and 22M.

For projection applications, the reflectance ($R=r^2$, where r is the reflectivity of the coatings) of the HR coatings 42 and 43 should be greater than 75%, or, in other embodiments, greater than 95%. The reflectance of HR coating 42 may be made a little less than HR coating 43 to allow filtered light to more easily egress from the top of the filter. In any event, as described previously, if $\Sigma nd$ is an integral multiple of a source wavelength, the reflected light 220 will be directed through a lens system 230. The bandwidth of the reflected light will be determined by the reflectance of the reflective layers. The total spacing between reflective layers or coatings can range from under 1 μm to over 10 μm. As noted previously, the total thickness of the film should be minimized to reduce power consumption and decrease response time.

In summary, direct view displays include computer monitors and televisions, as well as portable displays in cell phones, PDA's, portable games, GPS devices and many others. It is believed that the disclosed technology has several advantages over prior art such as LCD and plasma, particularly that it will yield superior picture quality, require significantly less energy to operate, and will be less costly to produce.

The embodiments shown will incur lower production costs than LCD or plasma because the number of electronics parts needed is cut by one-half or more (including capacitors, thin film transistors, and data drivers). Additionally, using fewer TFTs translates to a lower rejection rate for screens, which is a manufacturing problem for current TFT-based active matrix LCD displays.

The energy savings comes from the fact that the present technology eliminates the need for many of the polarization and absorbance filters. Color absorbance filters can absorb 75% of the source light. Polarization filters, such as those used in LCD displays, can absorb 60% of the source light. The display using this invention has a high light efficiency and will transmit almost the entire source light. A lower power source light may be used and give the same luminance as an LCD display with a higher power light source. Additionally, higher power, more bright light sources that give brighter displays may be used without heat buildup.

The present technology offers superior picture quality to LCD and plasma for a variety of reasons. First, the disclosed light modulators allow for quicker response time, which translates to fast motion without blurriness. Secondly, unlike LCD and plasma, the present technology does not require sub-pixels; therefore, the display is able to provide a higher resolution. The present technology also eliminates the need for polarization and absorbance filters, resulting in brighter picture, wider color gamut, more pure spectral colors, and the ability to use more than three primary colors at a time. And, because the disclosed modulators require less than half of the electronics parts used in traditional LCD or plasma technologies, the present modulators will accommodate a larger display area and eliminate the "screen door" effect common with LCD and plasma displays.

The disclosed embodiments are also believed to have multiple advantages over current projection displays, such as digital micromirror devices (DMD), liquid crystal (LCD), and liquid crystal on silicon (LCOS). Again, the predominant benefits include the need for less energy to operate, lower production costs, and improved picture quality.

The invention will use less energy than current technology because of the elimination of polarization filters and because of the elimination of absorbance filters.

Production costs will be lower with the present technology because of the reduced number of necessary electronics parts, which will be cut by more than one-half. Full color control within one light valve can be attained without the use of absorbance color wheels. Additionally, the present technology will be simpler to manufacture than DMD.

The invention has many additional advantages over current toner/fuser printer technologies, including laser and LED array. For instance, the present technology allows for improved, multiple resolutions. With the present invention, there is no need for a complicated system of lasers and rotating mirrors and lenses, as is the case with current laser printers. Furthermore, the present invention is not limited by the size of the laser dot, as with laser technology, nor is it limited by the size of the LEDs in an LED array.

The present technology also provides a less costly alternative to laser printers by eliminating the need for expensive lasers. Additionally, greater speed is achievable because whole lines can be projected across the imaging drum at a single time.

The invention allows for finer detail than is available from current technologies because of the variation in light intensity that can be projected on the image drum. In contrast, current LED array printers and laser printers work in a single "on" or "off" mode.

This invention can also be used as a filter for digital cameras, video cameras, and other image formation devices.

The invention is an improvement over current technologies because it will eliminate the need for individual fixed absorbance filters on the CCD or CMOS, thereby providing a broader color gamut in image formation. The present invention can compensate for the response of the CCD or CMOS to different wavelengths of light. Additionally, the invention can collect specified wavelengths in low light situations and compensate for differing lighting conditions.

The invention can be used as an electronically tunable filter that can rapidly control spectral output. Some of the advantages are: fast response time, polarization insensitivity, small thickness, low loss, random access to wavelengths, broad spectral range, low power consumption, stability in harsh environments (heat and humidity).

With a monochromatic light source such as laser or LED, the invention can be used as a spatial light modulator that can modulate a beam of light into a spatial pattern of light and dark controlled electronically. It has many advantages over LCD and DMD.

The invention can be used as an optical filter for UV/visible, NIR and IR spectroscopy, including usage as an interferometer in Fourier transform spectrometers.

In microscopy, control of both the input and the output light, both illumination and collection in bright field, dark field, phase contrast, confocal, as well as interference microscopy.

The invention can be used as a spatial light modulator for holographic applications including holographic data storage and holographic displays. The invention can be used as a tunable filter and optical modulator in wavelength division multiplexing (WDM) and data bus applications. The invention can also be used to compensate for lack of parallelism and other aberrations in large Fabry Perot etalons and interferometers. Filter elements can be tuned across an area to compensate for lack of parallelism and other defects.

Other possible uses include, image former for large format printers including lithography, near-to-eye displays, optical computing elements, white light color temperature adjuster, saturated color maker for stage lighting, tunable laser, and micro-chemical systems/DNA arrays.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A light filter, comprising:
a pair of opposed substrates having a gap therebetween;
an electrode disposed on each of said substrates, wherein each pairing of said electrode and said substrate has associated therewith reflective properties;
a polymer film disposed on and chemically bonded to one of said electrodes, wherein application of a voltage across said electrodes causes a corresponding uniform change in a thickness of said polymer film.

2. The light filter according to claim 1, further comprising:
a reflective coating disposed on one of each said electrode and said substrate pairing.

3. The light filter according to claim 2, wherein said reflective coatings have a reflectance greater than 75%.

4. The light filter according to claim 3, wherein said reflectance is greater than 90%.

5. The light filter according to claim 4, wherein said reflectance is greater than 99%.

6. The light filter according to claim 1, further comprising:
a plurality of spacers disposed between said substrates to maintain said gap, wherein a change in said thickness of said polymer film results in a variation of an optical path length of the filter.

7. The light filter according to claim 6, wherein application of said voltage causes said polymer film to change from an unactivated condition to either a compressed condition or an extended condition.

8. The light filter according to claim 7, wherein said extended condition of said polymer film is less than said gap.

9. The light filter according to claim 7, wherein said thickness of said polymer film in said unactivated condition is less than five microns.

10. The light filter according to claim 7, wherein said thickness of said polymer film in said unactivated condition is less than one micron.

11. The light filter according to claim 1, wherein said polymer film is a soft solid having a tangent delta of less than 0.15 and modulus of less than about 40,000 pascals.

12. The light filter according to claim 1, wherein said polymer film is a soft solid having a tangent delta of less than 0.05.

13. The light filter according to claim 1, further comprising:
a controller connected to said electrodes to control application of said voltage to said polymer film.

14. The light filter according to claim 1, wherein said polymer film comprises a monolayer.

15. The light filter according to claim 14, wherein said polymer film comprises a polar group that causes said polymer film to be responsive to application of said voltage.

16. The light filter according to claim 1, wherein said polymer film comprises a polymer selected from the group consisting of acrylic, polyurethane, saturated rubber, polysiloxane, and copolymers and terpolymers thereof, and wherein the polymer is modified to be responsive to an electric field.

17. The light filter according to claim 1, wherein said polymer comprises polysiloxane.

18. The light filter according to claim 17, wherein said polymer comprises polymer having a polydispersity of less than about 1.5.

19. The light filter according to claim 17, wherein said polymer comprises polymer molecules that contains from zero up to about 1.5 ionic groups per polymer molecule.

20. The light filter according to claim 19, wherein the polymer molecules contain one or more ionic groups selected from the group consisting of sulfonate, sulfate, phosphonate, phosphate, polyphosphate, carboxylate, acrylate, germinate, silicate, and ammonium groups.

21. The light filter according to claim 17, wherein the polysiloxane is grafted to one or more low molecular weight polymers selected from the group consisting of polyacrylates, polyethers, polystyrenes, polysulphones, polyureas, polyamides, polyimides, polyamide-imides, polyesters, polycarbonates, and epoxy resins.

22. The light filter according to claim 17, wherein the polysiloxane includes one or more non-reactive groups selected from the group consisting of phenyl groups, fluoroalkyl groups, alkyl groups containing 2 or more carbon atoms, and cyano groups.

23. The light filter according to claim 17, wherein the polysiloxane is bonded chemically or physically to nano particles, wherein the nano particles are selected from the group consisting of nanoclay, activated calcium carbonate, silica, POSS, and surface modified silica.

24. The light filter according to claim 17, wherein the polysiloxane is bonded at multiple sites to phenyl silanes selected from the group consisting of triphenyl silane and triphenyl vinyl silane.

25. The light filter according to claim 17, wherein said polymer comprises polymer molecules contain one or more non-ionic polar functional groups with unsymmetrical charge distribution.

26. The light filter according to claim 25, wherein said non-ionic polar functional groups are selected from the group consisting of polypropylene oxide, polyphenylene oxide, and polyvinyl ethers.

27. The light filter according to claim 17, wherein the polysiloxane is linear polydimethyl siloxane.

28. The light filter according to claim 27, wherein said linear polydimethyl siloxane has two methyl groups bonded to each silicon atom.

29. The light filter according to claim 28, wherein at least one of said methyl groups is replaced by another substituent on a low percentage of silicon atoms.

30. The light filter according to claim 29, wherein said substituent is selected from the unreactive group consisting of phenyl groups, fluoroalkyl groups, alkyl groups containing two or more carbon atoms and cyano groups.

31. The light filter according to claim 1, wherein said polymer comprises a polymer having cationic functionality.

32. The light filter according to claim 1, wherein said polymer comprises a polymer having anionic functionality.

33. The light filter according to claim 1, further comprising:
  a second polymer film disposed on and chemically bonded to the other of said electrodes, wherein application of said voltage across said electrodes causes corresponding changes in thickness of said polymer films, and wherein said polymer films are sized to not contact the other upon application of said voltage.

34. The light filter according to claim 1, further comprising:
  an anti-reflective coating disposed on a side of one of said substrates outside of said gap, said substrate facing a light source.

35. The light filter according to claim 34, further comprising:
  an absorption layer disposed on a side of the other substrates outside of said gap and away from said light source.

36. The light filter according to claim 1, wherein said polymer film is patterned coated on said electrode.

37. The light filter according to claim 1, wherein said polymer film and said electrodes are patterned to form a matrix of filters.

38. The light filter according to claim 1, wherein said electrode is a reflective material.

39. The light filter according to claim 38, wherein said reflective material is selected from the group consisting of gold, silver, platinum, aluminum and alloys thereof.

40. The light filter according to claim 39, further comprising a dielectric material coated on said reflective material.

41. The light filter according to claim 1, wherein said uniform change in said thickness of said polymer film results in a change in an optical path length between said pair of opposed substrates.

* * * * *